United States Patent
Zhang et al.

(10) Patent No.: US 11,451,361 B2
(45) Date of Patent: Sep. 20, 2022

(54) SYSTEM AND METHOD FOR REPORTING SIGNAL QUALITY INFORMATION

(71) Applicant: Apple Inc., Cupertino, CA (US)

(72) Inventors: Yushu Zhang, Beijing (CN); Yakun Sun, San Jose, CA (US); Fangli Xu, Beijing (CN); Yuqin Chen, Shenzhen (CN); Dawei Zhang, Saratoga, CA (US); Haijing Hu, Beijing (CN); Chunhai Yao, Beijing (CN); Yuchul Kim, Santa Clara, CA (US); Hong He, Cupertino, CA (US); Wei Zeng, Santa Clara, CA (US); Haitong Sun, San Diego, CA (US)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 17/023,342

(22) Filed: Sep. 16, 2020

(65) Prior Publication Data
US 2021/0099271 A1    Apr. 1, 2021

(30) Foreign Application Priority Data
Sep. 27, 2019   (CN) .......................... 201910920474.0

(51) Int. Cl.
*H04L 5/00* (2006.01)
*H04B 7/06* (2006.01)
*H04W 24/10* (2009.01)

(52) U.S. Cl.
CPC ......... *H04L 5/0057* (2013.01); *H04B 7/0626* (2013.01); *H04W 24/10* (2013.01); *H04L 5/001* (2013.01)

(58) Field of Classification Search
CPC ..... H04L 5/0057; H04L 5/001; H04B 7/0626; H04W 24/10
See application file for complete search history.

(56) References Cited

U.S. PATENT DOCUMENTS

| | | |
|---|---|---|
| 10,931,342 B2 * | 2/2021 | Noh ..................... H04B 7/0626 |
| 2016/0233938 A1 * | 8/2016 | Mondal ............. H04W 72/0453 |

(Continued)

FOREIGN PATENT DOCUMENTS

| | | | | |
|---|---|---|---|---|
| WO | WO-2017050084 A1 * | 3/2017 | ............. | H04B 17/24 |
| WO | WO-2021162612 A1 * | 8/2021 | | |

OTHER PUBLICATIONS

Extended European Search Report for EP 20197452, dated Feb. 11, 2021, 8 pages.

*Primary Examiner* — Deepa Belur
(74) *Attorney, Agent, or Firm* — Kowert, Hood, Munyon, Rankin & Goetzel, P.C.

(57) ABSTRACT

A wireless user equipment (UE) may employ any of various mechanisms for reporting signal quality measurements to a wireless network. The UE may impose a time delay between measurement and reporting, based on a delay parameter K. The UE may average measurements obtained at different measurement instances. The UE may employ any of various schemes for prioritizing transmission of one type of report over another, when temporal collisions occur between different types of report. The UE may employ a differential report that includes a state for indicating that a beam is not workable. The UE may employ a beam index that includes a state for indicating an invalid beam. A base station may receive a signal quality report and determine workability of a beam, e.g., by triggering a report of channel state information.

20 Claims, 16 Drawing Sheets

(56) References Cited

U.S. PATENT DOCUMENTS

| | | | |
|---|---|---|---|
| 2018/0092088 A1* | 3/2018 | Song | H04W 72/042 |
| 2018/0098234 A1* | 4/2018 | Kim | H04B 7/0478 |
| 2019/0110254 A1 | 4/2019 | Yerramalli et al. | |
| 2019/0288763 A1 | 9/2019 | Oteri et al. | |
| 2020/0100129 A1* | 3/2020 | Sun | H04W 28/12 |
| 2020/0196179 A1* | 6/2020 | Kim | H04B 17/309 |
| 2020/0245166 A1* | 7/2020 | Kwak | H04B 7/024 |
| 2021/0167821 A1* | 6/2021 | Chen | H04B 7/0408 |

* cited by examiner

1200 perform N measurements for a beam at N respective measurement instances, wherein N is a positive integer, wherein the value of N used to perform said N measurements depends on whether a measurement restriction has been configured for said performing N measurements, wherein the value of N equals one when a measurement restriction has been configured, wherein the value of N is greater than one when a measurement restriction has not been configured  1210

transmit beam information to a base station, wherein the beam information includes quality information derived from the N measurements  1215

FIG. 12

1300 perform N signal measurements and M interference measurements for a beam, wherein the N signal measurements are performed at N respective measurement instances, wherein the M interference measurements are performed at M respective measurement instances, wherein each of the N signal measurements is based on a channel measurement resource (CMR) at a corresponding one of the N measurement instances, wherein each of the M signal measurements is based on an interference measurement resource (IMR) at a corresponding one of the M measurement instances  1310

transmit beam information to a base station, wherein the beam information includes quality information derived from the N signal measurements and the M interference measurements  1315

FIG. 13

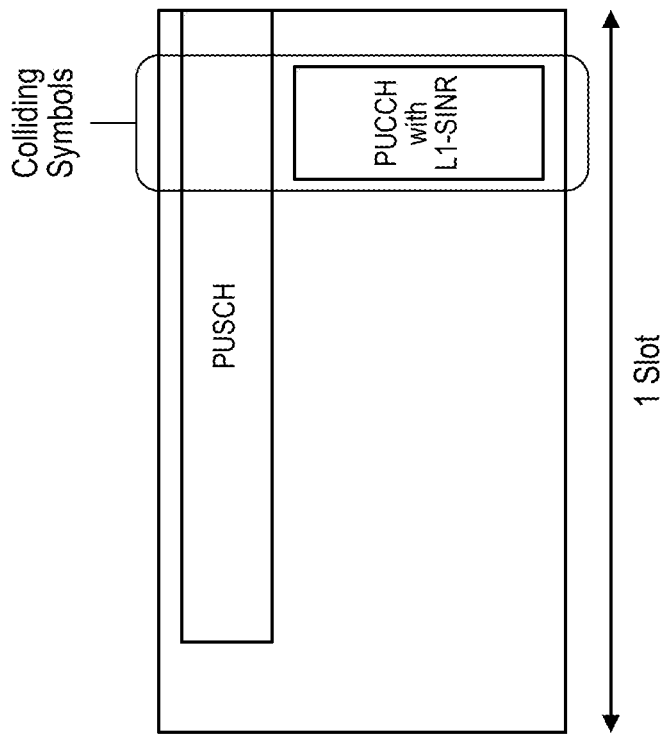
FIG. 14B (Case 2/4)
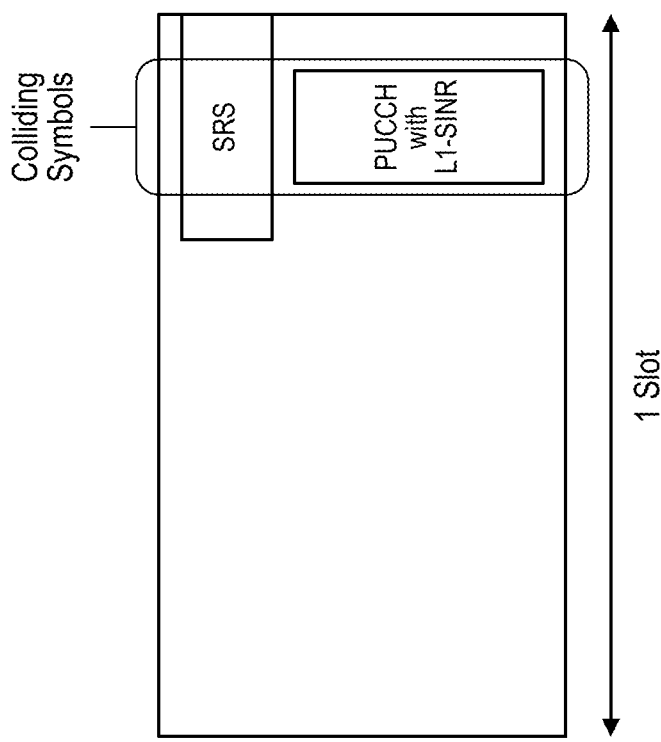
FIG 14A (Case 1)

| Reported value | Measured quantity value (difference in measured SINR from strongest SINR) | Unit |
|---|---|---|
| DIFFSINR_0 | 0 ≥ ΔSINR > -2 | dB |
| DIFFSINR_1 | -2 ≥ ΔSINR > -4 | dB |
| DIFFSINR_2 | -4 ≥ ΔSINR > -6 | dB |
| DIFFSINR_3 | -6 ≥ ΔSINR > -8 | dB |
| DIFFSINR_4 | -8 ≥ ΔSINR > -10 | dB |
| DIFFSINR_5 | -10 ≥ ΔSINR > -12 | dB |
| DIFFSINR_6 | -12 ≥ ΔSINR > -14 | dB |
| DIFFSINR_7 | -14 ≥ ΔSINR > -16 | dB |
| DIFFSINR_8 | -16 ≥ ΔSINR > -18 | dB |
| DIFFSINR_9 | -18 ≥ ΔSINR > -20 | dB |
| DIFFSINR_10 | -20 ≥ ΔSINR > -22 | dB |
| DIFFSINR_11 | -22 ≥ ΔSINR > -24 | dB |
| DIFFSINR_12 | -24 ≥ ΔSINR > -26 | dB |
| DIFFSINR_13 | -26 ≥ ΔSINR > -28 | dB |
| DIFFSINR_14 | -28 ≥ ΔSINR and SINR ≥ threshold | dB |
| DIFFSINR_15 | -28 ≥ ΔSINR and SINR < threshold | dB |

*FIG. 17*

| Reported value | Measured quantity value (difference in measured SINR from strongest SINR) | Unit |
|---|---|---|
| DIFFSINR_0 | $0 \geq \Delta SINR > -2$ | dB |
| DIFFSINR_1 | $-2 \geq \Delta SINR > -4$ | dB |
| DIFFSINR_2 | $-4 \geq \Delta SINR > -6$ | dB |
| DIFFSINR_3 | $-6 \geq \Delta SINR > -8$ | dB |
| DIFFSINR_4 | $-8 \geq \Delta SINR > -10$ | dB |
| DIFFSINR_5 | $-10 \geq \Delta SINR > -12$ | dB |
| DIFFSINR_6 | $-12 \geq \Delta SINR > -14$ | dB |
| DIFFSINR_7 | $-14 \geq \Delta SINR > -16$ | dB |
| DIFFSINR_8 | $-16 \geq \Delta SINR > -18$ | dB |
| DIFFSINR_9 | $-18 \geq \Delta SINR > -20$ | dB |
| DIFFSINR_10 | $-20 \geq \Delta SINR > -22$ | dB |
| DIFFSINR_11 | $-22 \geq \Delta SINR > -24$ | dB |
| DIFFSINR_12 | $-24 \geq \Delta SINR > -26$ | dB |
| DIFFSINR_13 | $-26 \geq \Delta SINR > -28$ | dB |
| DIFFSINR_14 | $-28 \geq \Delta SINR$ | dB |
| DIFFSINR_15 | Invalid beam | dB |

*FIG. 20*

| Reported value | Measured quantity value (difference in measured SINR from strongest SINR) | Unit |
|---|---|---|
| DIFFSINR_0 | $0 \geq \Delta SINR > -2$ | dB |
| DIFFSINR_1 | $-2 \geq \Delta SINR > -4$ | dB |
| DIFFSINR_2 | $-4 \geq \Delta SINR > -6$ | dB |
| DIFFSINR_3 | $-6 \geq \Delta SINR > -8$ | dB |
| DIFFSINR_4 | $-8 \geq \Delta SINR > -10$ | dB |
| DIFFSINR_5 | $-10 \geq \Delta SINR > -12$ | dB |
| DIFFSINR_6 | $-12 \geq \Delta SINR > -14$ | dB |
| DIFFSINR_7 | $-14 \geq \Delta SINR > -16$ | dB |
| DIFFSINR_8 | $-16 \geq \Delta SINR > -18$ | dB |
| DIFFSINR_9 | $-18 \geq \Delta SINR > -20$ | dB |
| DIFFSINR_10 | $-20 \geq \Delta SINR > -22$ | dB |
| DIFFSINR_11 | $-22 \geq \Delta SINR > -24$ | dB |
| DIFFSINR_12 | $-24 \geq \Delta SINR > -26$ | dB |
| DIFFSINR_13 | $-26 \geq \Delta SINR > -28$ | dB |
| DIFFSINR_14 | $-28 \geq \Delta SINR > -30$ | dB |
| DIFFSINR_15 | $-30 \geq \Delta SINR$ | dB |

*FIG. 21*

SYSTEM AND METHOD FOR REPORTING SIGNAL QUALITY INFORMATION

PRIORITY CLAIM INFORMATION

This application claims the benefit of priority to Chinese Patent Application No. 201910920474.0, filed Sep. 27, 2019, titled "System and Method for Reporting Signal Quality Information", which is hereby incorporated by reference in its entirety.

FIELD

The present disclosure relates to the field of wireless communication, and more particularly, to mechanisms enabling a user equipment device to report signal quality information such as signal to interference-and-noise ratio (SINR) to a wireless network.

DESCRIPTION OF THE RELATED ART

A wireless user equipment (UE) device may employ (receive and/or transmit) beamforming, e.g., to counteract the effects of propagation loss, environmental interference and/or noise, and susceptibility to blockage by objects such as buildings, trees, hand, head or body. A wireless base station may transmit a configuration message directing the UE to report a measurement of SINR for a beam. In response to receiving the message, the UE makes the measurement, and reports the measurement to the base station. The base station may use the report to decide whether the beam is to be used for communication with the UE. Thus, there exists a substantial need for mechanism capable of improving the performance of SINR reporting.

SUMMARY

In one set of embodiments, a method for operating a wireless user equipment (UE) device may include the following operations. The method may include performing a measurement for a beam in a first time interval (e.g., a first slot in time), and determining beam quality information based at least on the measurement. The measurement may include a measurement of SINR, e.g., based on a channel measurement resource (CMR) and an interference measurement resource (IMR) in a downlink signal. The method may also include transmitting the beam quality information to a base station in a second time interval (e.g., a second slot in time). The amount of delay between the first time interval and the second time interval may be controlled by a delay value K.

In another set of embodiments, a method for operating a wireless user equipment (UE) device may include the following operations. The method may include performing N measurements for a beam at N respective measurement instances, where N is a positive integer, and transmitting beam information to a base station, wherein the beam information includes quality information derived from the N measurements. (For example, the quality information may be determined by averaging the N measurements.) In some embodiments, the value of N used to perform said N measurements depends on whether a measurement restriction has been configured for said performing N measurements, where the value of N equals one when a measurement restriction has been configured, wherein the value of N is greater than one when a measurement restriction has not been configured.

In another set of embodiments, a method for operating a wireless user equipment (UE) device may include the following operations. The method may include performing N signal measurements and M interference measurements for a beam, wherein N is a positive integer, and M is a positive integer. M may be different from N. The N signal measurements may be performed at N respective measurement instances; and the M interference measurements may be performed at M respective measurement instances. (The instances may correspond to intervals in time, such as time slots.) Each of the N signal measurements may be based on a channel measurement resource (CMR) at a corresponding one of the N measurement instances; and each of the M signal measurements may be based on an interference measurement resource (IMR) at a corresponding one of the M measurement instances. The method may also include transmitting beam information to a base station, wherein the beam information includes quality information derived from the N signal measurements and the M interference measurements.

In another set of embodiments, a method for operating a wireless user equipment (UE) device may include the following operations. In response to determining that a first sounding reference signal (SRS) and a first uplink control channel with first signal quality information are indicated for uplink transmission on a first carrier and during a first time interval, the method may include transmitting, on the first carrier and during the first time interval, the first uplink control channel including the first signal quality information without transmitting the first SRS. The action of suppressing transmission of the SRS may enable the generate one or more transmit symbols containing the first the uplink control channel with decreased peak-to-average power ratio (PAPR).

In another set of embodiments, a method for operating a wireless user equipment (UE) device may include the following operations. The method may include determining that two or more different types of channel state information (CSI) in a set of CSI types are indicated for transmission during a first time interval (e.g., a first time slot or symbol interval), wherein a first of the two or more different types correspond at least to signal quality information. The method may also include selecting one of the two or more different types of CSI for transmission during the first time interval based on a ranking of CSI types in said set; and during the first time interval, transmitting data corresponding to the selected type of CSI information, wherein one or more different types not selected by said selecting are not transmitted during the first time interval.

In another set of embodiments, a method for operating a wireless user equipment (UE) device may include the following operations. The method may include transmitting a first differential signal quality report for a first beam. The first differential signal quality report may indicate that a first differential measure of signal quality of the first beam relative to a reference beam is less than or equal to a quantization boundary value and that a first absolute measure of the signal quality of the first beam is less than a workability threshold.

In another set of embodiments, a method for operating a wireless user equipment (UE) device may include the following operations. The method may include receiving configuration information indicating a request for reporting of signal quality information for N strongest beams in a set of available beams, where N is greater than one; and performing signal quality measurements (e.g., measurements of SINR) on the set of available beams. The method may also include: based on the signal quality measurements, determining that the set of available beams presently includes M less than N workable beams; and transmitting information indicating that the set of available beams does not include N workable beams. A beam may be deemed to be workable if its signal quality measurement is greater than a workability threshold.

In another set of embodiments, a method for operating a wireless base station may include the following operations. The base station may receive an SINR report for a given beam from a wireless user equipment device. In response to determining that an SINR indicated by the SINR report is greater than a workability threshold, the base station may transmit configuration information directing the wireless UE device to report channel state information (CSI) for the given beam. In response to receiving a CSI report for the given beam from the user equipment device, the base station may determine, based on the CSI report, whether the given beam is of sufficient quality to support communication with the wireless device. In response to determining that the given beam is of sufficient quality to support communication with the wireless UE device, the base station may transmit a control message that directs the wireless UE device to utilize the given beam for communication with the base station.

BRIEF DESCRIPTION OF THE DRAWINGS

A better understanding of the present subject matter can be obtained when the following detailed description of the preferred embodiment is considered in conjunction with the following drawings.

FIG. 12 is an example of a method for transmitting beam information that is derived from measurements taken at a plurality of measurement instances, according to some embodiments.

FIG. 13 is an example of a method for transmitting beam information that is derived from N signal measurements and M interference measurements, with N and M each being greater than one, according to some embodiments.

FIG. 14A illustrates a case in which a Physical Uplink Control Channel (PUCCH) containing an SINR report collides (occurs in the same symbols) with a sounding reference signal (SRS), according to some embodiments.

FIG. 14B illustrates a scenario in which a Physical Uplink Control Channel (PUCCH) containing an SINR report collides (occurs in the same symbols) with a Physical Uplink Shared Channel (PUSCH), according to some embodiments.

FIG. 17 illustrates an example of a differential SINR report, which has a special state used to indicate when a beam is not workable, according to some embodiments.

FIG. 20 illustrates an example of a differential SINR report, which has a special state used to indicate the existence of an invalid (or non-workable) beam, according to some embodiments.

FIG. 21 illustrates an example of a differential SINR report that may be transmitted by a user equipment device when the base station is tasked with determining beam workability, according to some embodiments.

Figure 1:
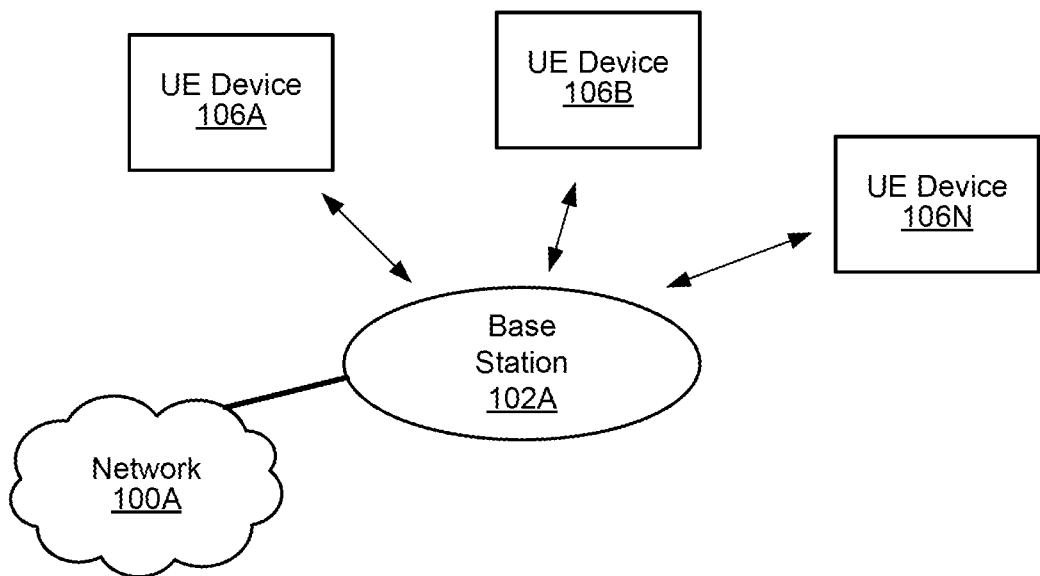
FIGS. 1-2 illustrate examples of wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
5G NR: 5$^{th}$ Generation New Radio
BW: Bandwidth
BWP: Bandwidth Part
CA: Carrier Aggregation
CQI: Channel Quality Indictor
CSI: Channel State Information
DC: Dual Connectivity DCI: Downlink Control Information
DL: Downlink
eNB (or eNodeB): Evolved Node B, i.e., the base station of 3GPP LTE
eUICC: embedded UICC
gNB (or gNodeB): next Generation NodeB, i.e., the base station of 5G NR
GSM: Global System for Mobile Communications
HARQ: Hybrid ARQ
LTE: Long Term Evolution
LTE-A: LTE-Advanced
MAC: Medium Access Control
MAC-CE: MAC Control Element
NR: New Radio
NR-DC: NR Dual Connectivity
NW: Network
RACH: Random Access Channel
RAT: Radio Access Technology
RLC: Radio Link Control
RLM: Radio Link Monitoring
RRC: Radio Resource Control
RRM: Radio Resource Management
RS: Reference Signal
SR: Scheduling Request
SRS: Sounding Reference Signal
SSB: Synchronization Signal Block
UE: User Equipment
UL: Uplink
UMTS: Universal Mobile Telecommunications System Terms The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to any of various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
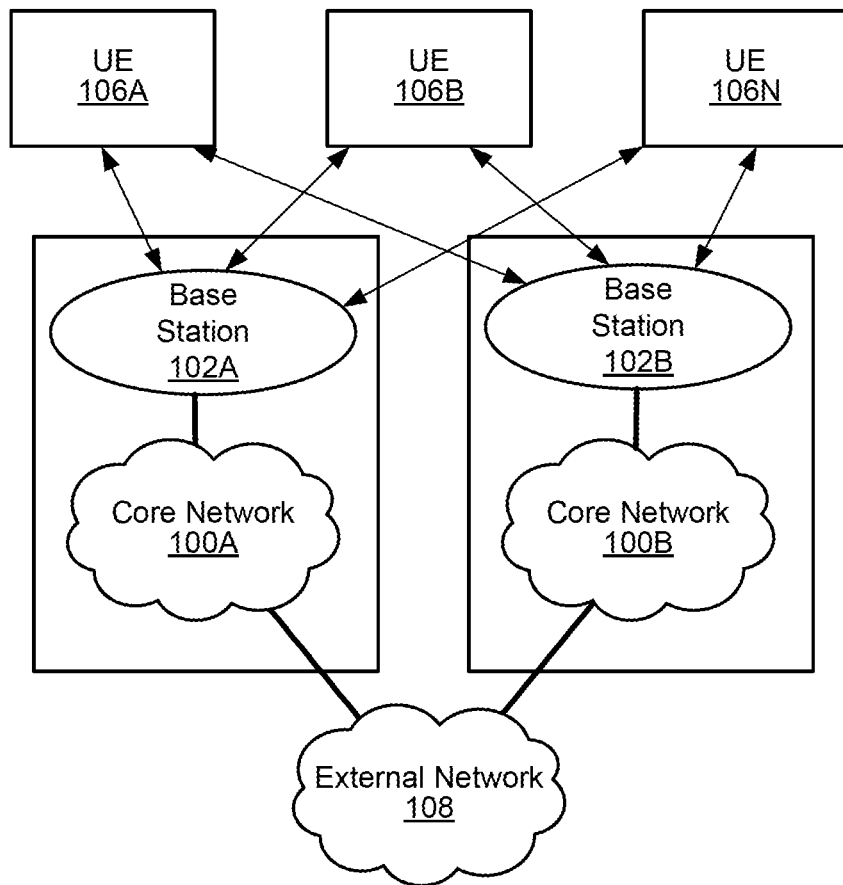
Figure 3:
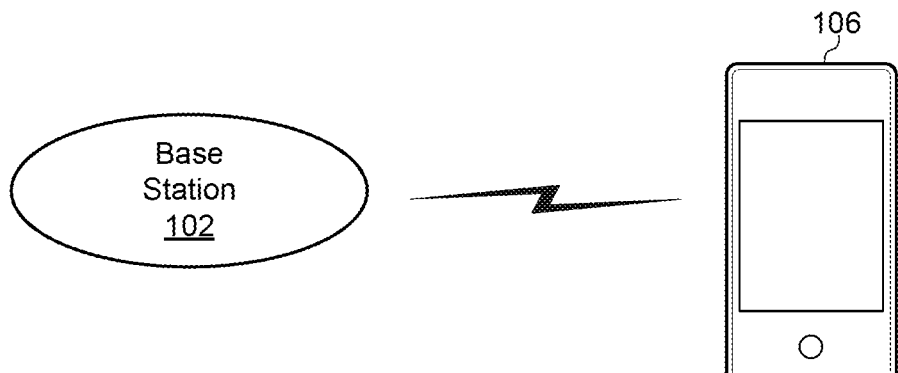
FIG. 3 illustrates an example of a base station in communication with a user equipment device, according to some embodiments.

FIGS. 1-3: Communication System

FIGS. 1 and 2 illustrate exemplary (and simplified) wireless communication systems. It is noted that the systems of FIGS. 1 and 2 are merely examples of certain possible systems, and various embodiments may be implemented in any of various ways, as desired.

The wireless communication system of FIG. 1 includes a base station 102A which communicates over a transmission medium with one or more user equipment (UE) devices 106A, 106B, etc., through 106N. Each of the user equipment devices may be referred to herein as "user equipment" (UE). In the wireless communication system of FIG. 2, in addition to the base station 102A, base station 102B also communicates (e.g., simultaneously or concurrently) over a transmission medium with the UE devices 106A, 106B, etc., through 106N.

The base stations 102A and 102B may be base transceiver stations (BTSs) or cell sites, and may include hardware that enables wireless communication with the user devices 106A through 106N. Each base station 102 may also be equipped to communicate with a core network 100 (e.g., base station 102A may be coupled to core network 100A, while base station 102B may be coupled to core network 100B), which may be a core network of a cellular service provider. Each core network 100 may be coupled to one or more external networks (such as external network 108), which may include the Internet, a Public Switched Telephone Network (PSTN), or any other network. Thus, the base station 102A may facilitate communication between the user devices and/or between the user devices and the network 100A; in the system of FIG. 2, the base station 102B may facilitate communication between the user devices and/or between the user devices and the network 100B.

The base stations 102A and 102B and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc.

For example, base station 102A and core network 100A may operate according to a first cellular communication standard (e.g., LTE) while base station 102B and core network 100B operate according to a second (e.g., different) cellular communication standard (e.g., GSM, UMTS, and/or one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the network configuration shown in FIG. 2, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., LTE and CDMA 1×RTT, GSM and UMTS, or any other combination of cellular communication technologies) might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus in this case, despite utilizing similar and possibly compatible cellular communication technologies, the UE devices 106A-106N might communicate with the base stations 102A-102B independently, possibly by utilizing separate subscriber identities to communicate with different carriers' networks.

A UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). As another example, a UE 106 might be configured to communicate using different 3GPP cellular communication standards (such as two or more of GSM, UMTS, LTE, or LTE-A). Thus, as noted above, a UE 106 might be configured to communicate with base station 102A (and/or other base stations) according to a first cellular communication standard (e.g., LTE) and might also be configured to communicate with base station 102B (and/or other base stations) according to a second cellular communication standard (e.g., one or more CDMA2000 cellular communication standards, UMTS, GSM, etc.).

Base stations 102A and 102B and other base stations operating according to the same or different cellular communication standards may thus be provided as one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 3 illustrates user equipment 106 (e.g., one of the devices 106A through 106N) in communication with a base station 102 (e.g., one of the base stations 102A or 102B). The UE 106 may be a device with wireless network connectivity such as a mobile phone, a hand-held device, a computer or a tablet, a wearable device or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS (W-CDMA, TD-SCDMA, etc.), CDMA2000 (1×RTT, 1×EV-DO, HRPD, eHRPD, etc.), LTE, LTE-A, WLAN, or GNSS. Other combinations of wireless communication standards are also possible.

The UE 106 may include one or more antennas for communicating using one or more wireless communication protocols. Within the UE 106, one or more parts of a receive and/or transmit chain may be shared between multiple wireless communication standards; for example, the UE 106 might be configured to communicate using either (or both) of GSM or LTE using a single shared radio. The shared radio may include a single antenna, or may include multiple antennas (e.g., for MIMO or beamforming) for performing wireless communications. MIMO is an acronym for Multi-Input Multiple-Output.

Figure 4:
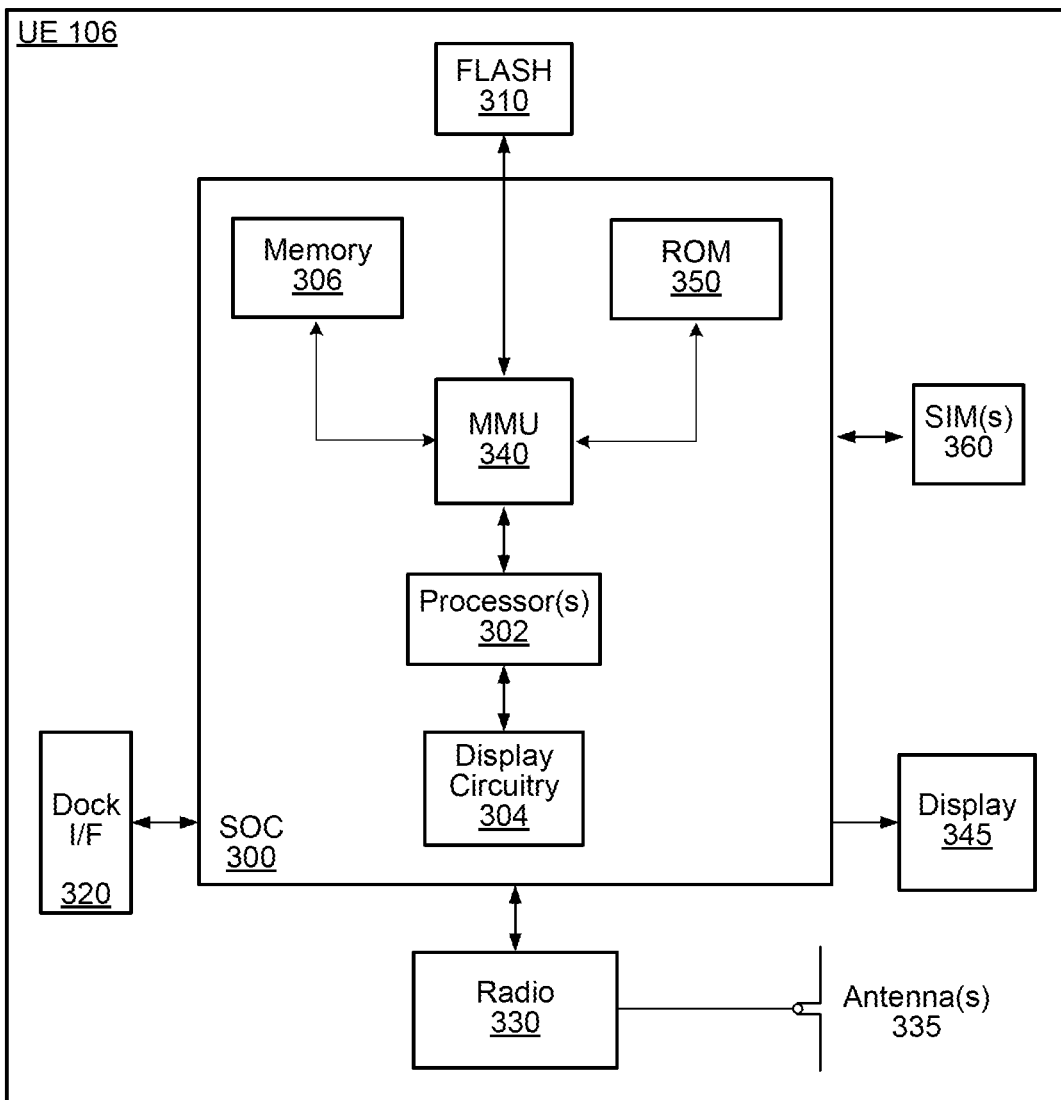
FIG. 4 illustrates an example of a block diagram of a user equipment device, according to some embodiments.

FIG. 4—Example of Block Diagram of a UE

FIG. 4 illustrates an example of a block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Flash memory 310), a connector interface 320 (e.g., for coupling to a computer system, dock, charging station, etc.), the display 345, and radio 330.

The radio 330 may include one or more RF chains. Each RF chain may include a transmit chain, a receive chain, or both. For example, radio 330 may include two RF chains to support dual connectivity with two base stations (or two cells). The radio may be configured to support wireless communication according to one or more wireless communication standards, e.g., one or more of GSM, UMTS, LTE, LTE-A, WCDMA, CDMA2000, Bluetooth, Wi-Fi, GPS, etc.

The radio 330 couples to antenna subsystem 335, which includes one or more antennas. For example, the antenna subsystem 335 may include a plurality of antennas to support applications such as dual connectivity or MIMO or beamforming. The antenna subsystem 335 transmits and receives radio signals to/from one or more base stations or devices through the radio propagation medium, which is typically the atmosphere.

In some embodiments, the processor(s) 302 may include a baseband processor to generate uplink baseband signals and/or to process downlink baseband signals. The processor(s) 302 may be configured to perform data processing according to one or more wireless telecommunication standards, e.g., one or more of GSM, UMTS, LTE, LTE-A, WCDMA, CDMA2000, Bluetooth, Wi-Fi, GPS, etc.

The UE 106 may also include one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more sensors, one or more buttons, sliders, and/or dials, and/or any of various other elements capable of providing information to a user and/or receiving/interpreting user input.

As shown, the UE 106 may also include one or more subscriber identity modules (SIMs) 360. Each of the one or more SIMs may be implemented as an embedded SIM (eSIM), in which case the SIM may be implemented in device hardware and/or software. For example, in some embodiments, the UE 106 may include an embedded UICC (eUICC), e.g., a device which is built into the UE 106 and is not removable. The eUICC may be programmable, such that one or more eSIMs may be implemented on the eUICC. In other embodiments, the eSIM may be installed in UE 106 software, e.g., as program instructions stored on a memory medium (such as memory 306 or Flash 310) executing on a processor (such as processor 302) in the UE 106. As one example, a SIM 360 may be an application which executes on a Universal Integrated Circuit Card (UICC). Alternatively, or in addition, one or more of the SIMs 360 may be implemented as removeable SIM cards.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as or include: a programmable hardware element, such as an FPGA (Field Programmable Gate Array); or an ASIC (Application Specific Integrated Circuit); or a combination thereof.

Figure 5:
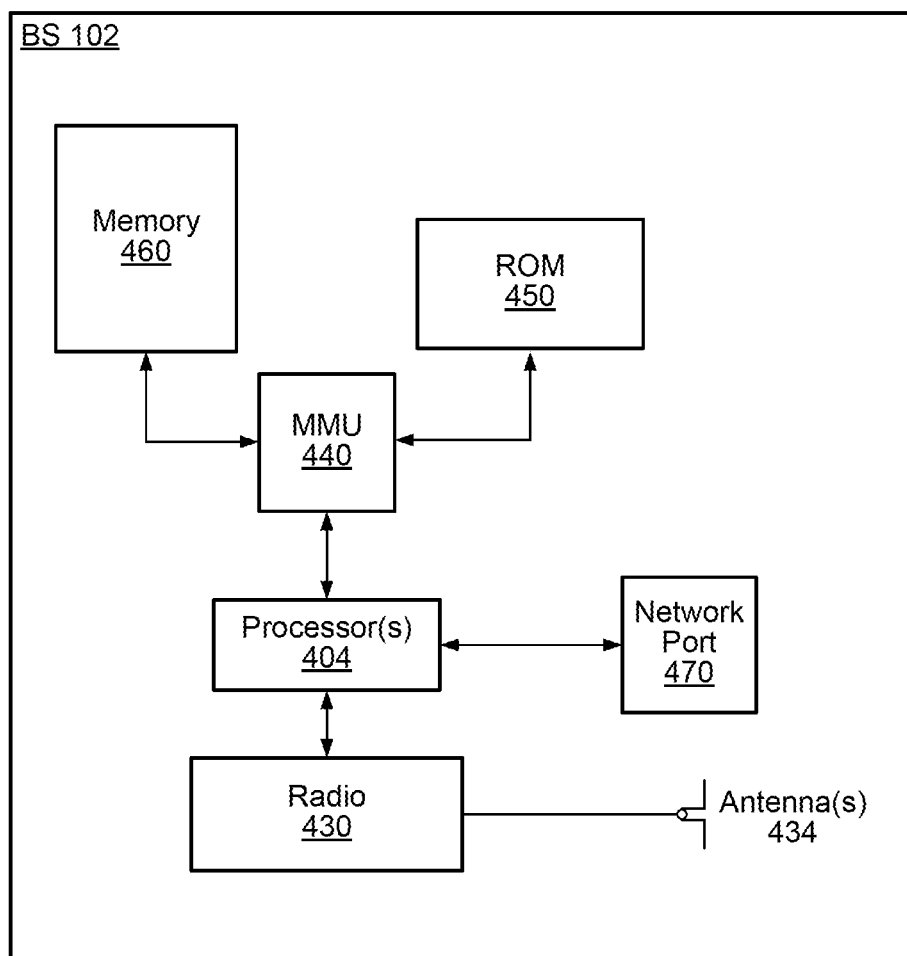
FIG. 5 illustrates an example of a block diagram of a base station, according to some embodiments.

FIG. 5—Example of a Base Station

FIG. 5 illustrates a block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory ROM 450) or to other circuits or devices.

The base station 102 may include at least one network port 470. The network port 470 may be configured to couple to a telephone network and provide access (for a plurality of devices, such as UE devices 106) to the telephone network, as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430 having one or more RF chains. Each RF chain may include a transmit chain, a receive chain, or both. (For example, the base station 102 may include at least one RF chain per sector or cell.) The radio 430 couples to antenna subsystem 434, which includes one or more antennas. Multiple antennas would be needed, e.g., to support applications such as MIMO or beamforming. The antenna subsystem 434 transmits and receives radio signals to/from UEs through the radio propagation medium (typically the atmosphere).

In some embodiments, the processor(s) 404 may include a baseband processor to generate downlink baseband signals and/or to process uplink baseband signals. The baseband processor 430 may be configured to operate according to one or more wireless telecommunication standards, including, but not limited to, GSM, LTE, WCDMA, CDMA2000, etc.

The processor(s) 404 of the base station 102 may be configured to implement part or all of the methods described herein, e.g., by executing program instructions stored on a memory medium (e.g., a non-transitory computer-readable memory medium). In some embodiments, the processor(s) 404 may include: a programmable hardware element, such as an FPGA (Field Programmable Gate Array); or an ASIC (Application Specific Integrated Circuit); or a combination thereof.

Wireless User Equipment Device 600

Figure 6:
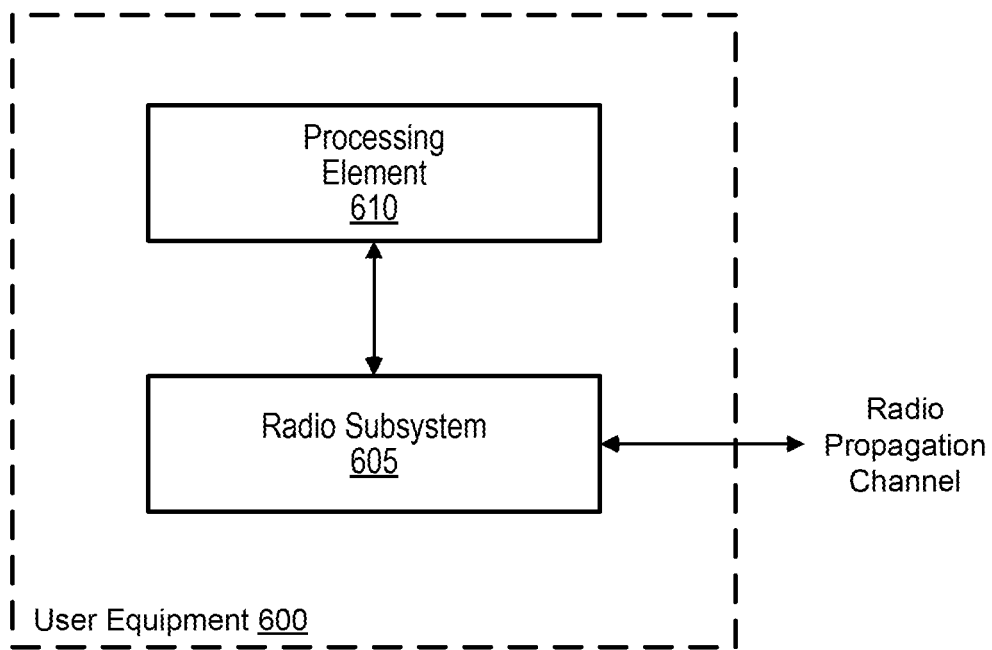
FIG. 6 illustrates an example of a user equipment 600, according to some embodiments.

In some embodiments, a wireless user equipment (UE) device 600 may be configured as shown in FIG. 6. UE device 600 may include: a radio subsystem 605 for performing wireless communication; and a processing element 610 operatively coupled to the radio subsystem. (UE device 600 may also include any subset of the UE features described above, e.g., in connection with FIGS. 1-4.)

The radio subsystem 605 may include one or more RF chains, e.g., as variously described above. Each RF chain may be configured to receive signals from the radio propagation channel and/or transmit signals onto the radio propagation channel. Thus, each RF chain may include a transmit chain and/or a receive chain. The radio subsystem 605 may be coupled to one or more antennas (or arrays of antennas) to facilitate signal transmission and reception. Each RF chain (or, some of the RF chains) may be tunable to a desired frequency, thus allowing the RF chain to receive or transmit at different frequencies at different times.

The radio subsystem 605 may be coupled to one or more antenna panels (or antenna arrays), e.g., to support beamforming of received downlink signals and/or transmitted uplink signals.

The processing element 610 may be coupled to the radio subsystem, and may be configured as variously described above. (For example, processing element may be realized by processor(s) 302.) The processing element may be configured to control the state of each RF chain in the radio subsystem.

In some embodiments, the processing element may include one or more baseband processors to (a) generate baseband signals to be transmitted by the radio subsystem and/or (b) process baseband signals provided by the radio subsystem.

In various embodiments described herein, when a processing element of a wireless user equipment device is said to transmit and/or receive information to/from a wireless base station, it should be understood that such transmission and/or reception occurs by the agency of a radio subsystem such as radio subsystem 605. Transmission may involve the submission of signals and/or data to the radio subsystem, and reception may involve the action of receiving signals and/or data from the radio subsystem.

In some embodiments, the UE device 600 may include beamforming circuitry. The beamforming circuitry may be configured to receive downlink signals from respective antennas of an antenna array of the UE device, and to apply receive beamforming to the downlink signals. For example, the beamforming circuitry may apply weights (e.g., complex weights) to the respective downlink signals, and then combine the weighted downlink signals to obtain a beam signal, where the weights define a reception beam. The beamforming circuitry may also be configured to apply weights to respective copies of an uplink signal, and to transmit the weighted uplink signals via respective antennas of the antenna array of the UE device, wherein the weights define a transmission beam.

In some embodiments, the beamforming circuitry may be implemented by (or included in) the processing element 610. In other embodiments, beamforming circuitry may be included in the radio subsystem 605.

In some embodiments, the UE device 600 (e.g., the processing element 610) may be configured to receive a configuration message from the base station. The configuration message may direct the UE device to measure one or more beams, and to report the measurement(s) to the base station. The configuration message may request any of different types of reporting, e.g., periodic, semi-static, aperiodic, etc. The configuration message may indicate any of different types of measurements, e.g., signal to interference-and-noise ratio (SINR), any of various types of channel quality information (CQI), reference signal receiver power (RSRP), etc.

In some embodiments, the radio subsystem 605 may be configured to transmit and receive in a plurality of frequency bands (or frequency ranges). One or more of those frequency bands may occur in the millimeter wave regime of the electromagnetic spectrum, where the effects of propagation loss and signal blockage may be significant. Thus, the use of beamforming at the UE device 600 (and/or at the base station) may be useful in mitigating such effects. To enhance the effectiveness of beamforming, the UE device 600 may provide reports of signal quality on one or more beams, e.g., as configured by the base station.

In some embodiments, the UE 600 (e.g., the processing element) may support carrier aggregation. Carrier aggregation (CA) involves the concatenation of a plurality of component carriers (CCs), which increases the bandwidth and data rate to and/or from the UE 600. When carrier aggregation is employed, the timing of frames may be aligned across cells involved in the aggregation. Different embodiments may support different maximum bandwidths and numbers of component carriers. In some embodiments, the UE 600 may concatenate component carriers from two or more base stations, of the same or different radio access technology. (For example, in some embodiments, the UE may perform carrier aggregation with an eNB of 3GG LTE and a gNB of 5G NR.) In some embodiments, the UE 600 may support both contiguous carriers and non-contiguous carriers.

In some embodiments, in a dual connectivity mode of operation, the processing element may direct a first RF chain to communicate with a first base station using a first radio access technology and direct a second RF chain to communicate with a second base station using a second radio access technology. For example, the first RF chain may communicate with an LTE eNB, and the second RF chain may communicate with a gNB of 5G New Radio (NR). The link with the LTE eNB may be referred to as the LTE branch. The link with the gNB may be referred to as the NR branch. In some embodiments, the processing element may include a first subcircuit for baseband processing with respect to the LTE branch and a second subcircuit for baseband processing with respect to the NR branch.

The processing element 610 may be further configured as variously described in the sections below.

Wireless Base Station 700

Figure 7:
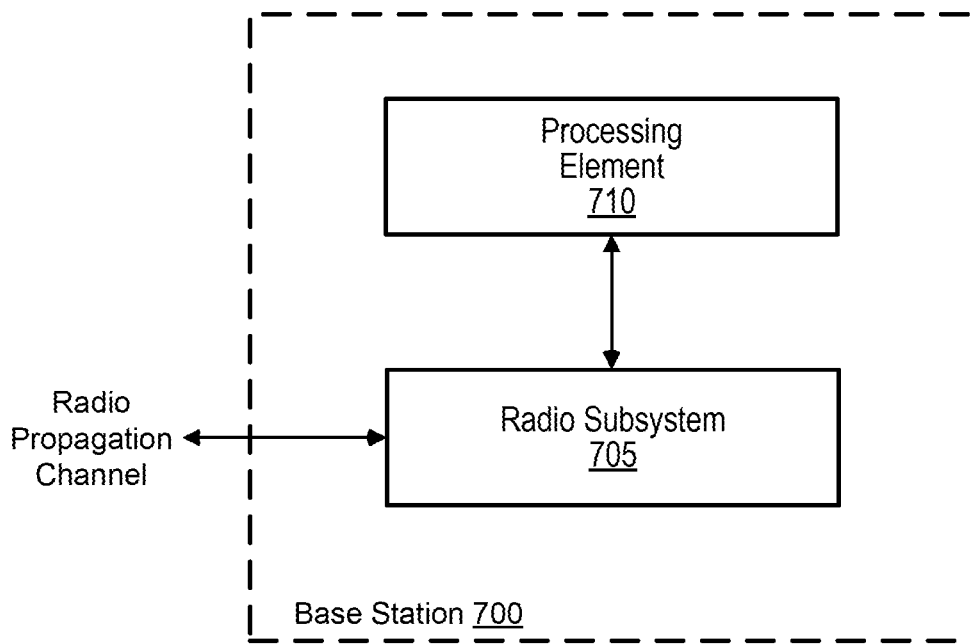
FIG. 7 illustrates an example of a base station 700, according to some embodiments. The base station 700 may be used to communicate with user equipment 600 of FIG. 6.

In some embodiments, a wireless base station 700 of a wireless network (not shown) may be configured as shown in FIG. 7. The wireless base station may include: a radio subsystem 705 for performing wireless communication over a radio propagation channel; and a processing element 710 operatively coupled to the radio subsystem. (The wireless base station may also include any subset of the base station features described above, e.g., the features described above in connection with FIG. 5.)

The radio subsystem 710 may include one or more RF chains. Each RF chain may be tunable to a desired frequency, thus allowing the RF chain to receive or transmit at different frequencies at different times.

The processing element 710 may be realized as variously described above. For example, in one embodiment, processing element 710 may be realized by processor(s) 404. In some embodiments, the processing element may include one or more baseband processors to: (a) generate baseband signals to be transmitted by the radio subsystem, and/or, (b) process baseband signals provided by the radio subsystem.

In some embodiments, the base station 700 may include beamforming circuitry. The beamforming circuitry may be configured to receive uplink signals from respective antennas of an antenna array of the base station, and to apply receive beamforming to the uplink signals. For example, the beamforming circuitry may apply weights (e.g., complex weights) to the respective uplink signals, and then combine the weighted uplink signals to obtain a beam signal, where the weights define a reception beam. Different reception beams may be used to receive from different UE devices. The beamforming circuitry may also be configured to apply weights to respective copies of a downlink signal, and to transmit the weighted downlink signals via respective antennas of the antenna array of the base station, where the weights define a transmission beam. Different transmission beams may be used to transmit to different UE devices.

In some embodiments, the beamforming circuitry may be implemented by (or included in) the processing element 710. In other embodiments, beamforming circuitry may be included in the radio subsystem 705.

The processing element 710 may be configured to perform any of the base station method embodiments described herein.

System and Method for SINR Based Beam Report

In some embodiments, a user equipment (UE) is able to report the signal to interference-and-noise ratio (SINR) for up to N beams in a beam reporting instance, where $N \in \{1, 2, 3, 4\}$. For example, the UE may report the N beams that are determined to be the strongest (or of highest quality) among the available beams. In $N>1$, an absolute SINR may be reported for the strongest beam, and differential SINR may be reported for the next N−1 strongest beams.

In some embodiments, the number N is configured by a base station (such as a gNB of 5G NR).

An SINR may be measured based on a Channel Measurement Resource (CMR) and an Interference Measurement Resource (IMR). The CMR may be used to make a channel measurement, and the IMR may be used to make an interference and/or noise measurement. In some embodiments, the CMR may be realized by the Synchronization Signal Block (SSB) or the Channel State Information Reference Signal (CSI-RS) of a downlink signal. In some embodiments, the IMR may be non-zero-power (NZP) based or zero-power (ZP) based.

The UE may compute the SINR, e.g., based on the ratio (or the difference, when thinking in logarithmic terms) of the channel measurement and the interference and/or noise measurement. The UE may determine the SINR for each beam in a set of available means, and rank the available beams according to SINR value. The weakest beams may be deemed not worth the effort of reporting to base station. The N strongest beams may be reported to the base station, e.g., as described above.

Figure 8:
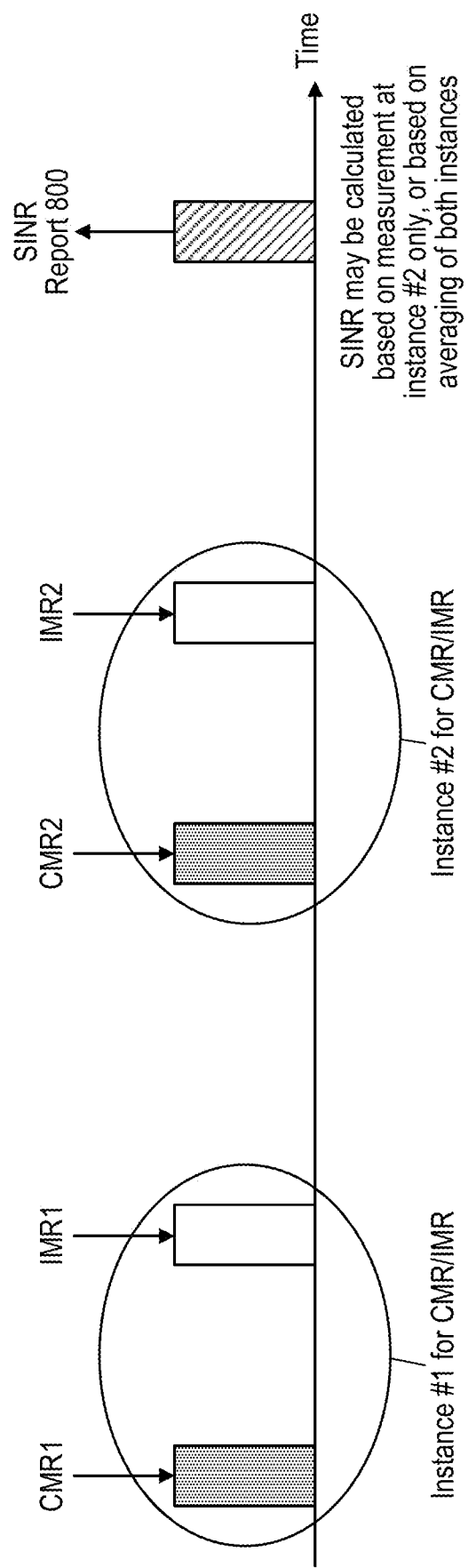
FIG. 8 illustrates an example of a report 800 of a signal to interference-and-noise ratio (SINR), according to some embodiments, wherein the SINR to be reported is based on a most recent measurement instance or an average over a plurality of measurement instances.

In some embodiments, the UE may measure and report an SINR based on the averaging of a plurality of instances of CMR/IMR, or based on one shot of CMR/IMR. For example, as shown in FIG. 8, an SINR report 800 may be based on an averaging of measurements at instances #1 and #2, or alternatively, based only on measurement(s) at instance #2 (i.e., the most recent instance). The UE may measure CMR1 and IMR1 at the instance #1 for CMR/IMR, and measure CMR2 and IMR2 at the instance #2 for CMR/IMR.

Reporting Based on a Single Measurement Instance

Figure 9:
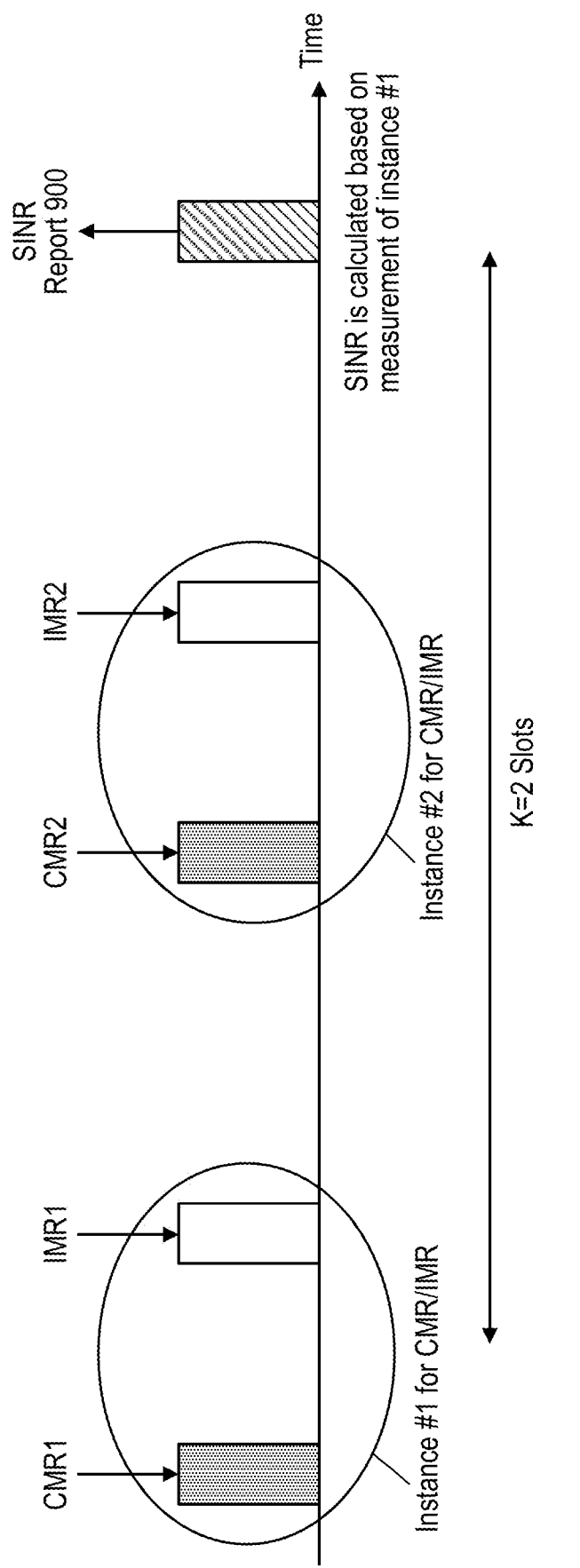
FIG. 9 illustrates an example of an SINR report 900, according to some embodiments, wherein a time delay between a time of measurement and a time of reporting is controlled by a delay parameter K.

In some embodiments, for each SINR report, the UE may determine the SINR based on a single shot measurement, i.e., based on measurement of the CMR and/or measurement of the IMR at a single instance (or interval) in time. For example, the SINR may be determined from the instance of the CMR and IMR occurring K slots before the slot in which the SINR is reported, where K is a non-negative integer. (K=0 would imply determining the SINR bases on the CMR and IMR occurring in the same slot as the SINR report.) FIG. 9 illustrates the case where K=2. In other words, the SINR is calculated based on the measurement of CMR and IMR at instance #1, which is two slots prior to the slot in which the SINR report 900 is transmitted.

In some embodiments, the SINR may be determined from the most recent instance of the CMR and IMR occurring at least K slots before the slot in which the SINR is reported, where K is a positive integer.

In some embodiments, the parameter K may be configured by higher layer signaling. Thus, the base station may be configured to transmit an indication of the parameter K to the UE, and the UE may be configured to receive the indication from the base station. For example, the indication may be included as part of a configuration message that directs the UE to report SINR.

In some embodiments, the parameter K is predefined, e.g., defined in the specification promulgated by a standardization organization. For example, the predefined value may be K=0, or K=1, or K=2, or K=3, or K=4, or some other value.

In some embodiments, the parameter K may vary from on UE to another. Thus, the UE may report its value of K to the base station, e.g., as part of a UE capability report.

In some embodiments, the UE may determine the parameter K based on the subcarrier spacing of the downlink bandwidth part where CMR and/or IMR is received. The base station may encode the parameter K in terms of the subcarrier spacing used to generate the bandwidth part containing the CMR and/or IMR.

In some embodiments, the UE may encode the parameter K in terms of the subcarrier spacing used to generate the uplink bandwidth part containing the SINR report. The base station may determine the parameter K based on that subcarrier spacing.

Figure 10:
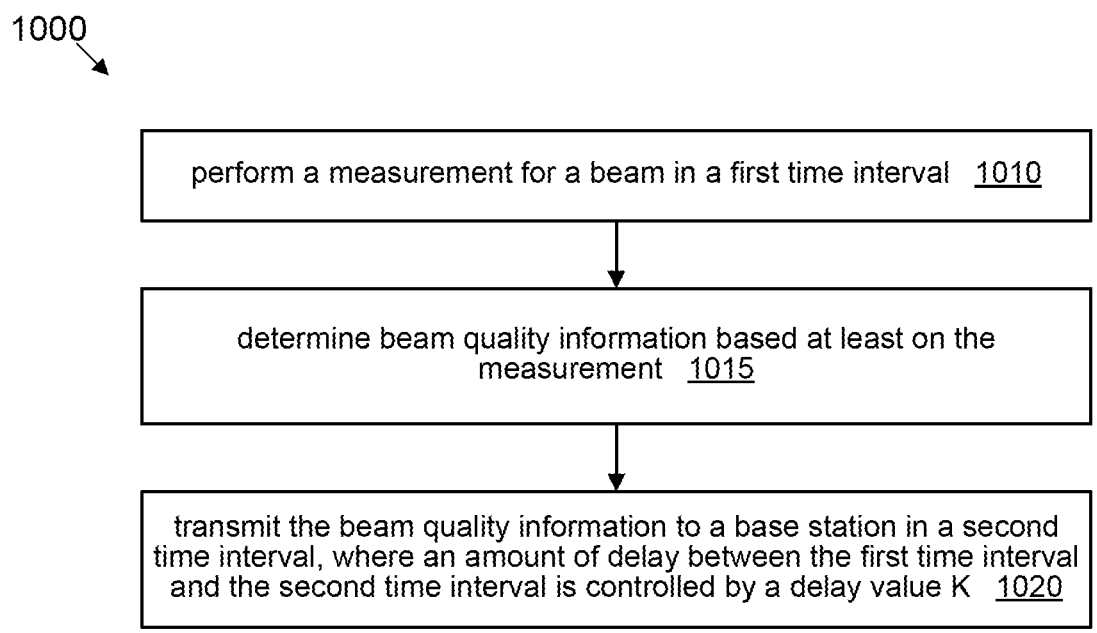
FIG. 10 is an example of a method for transmitting beam quality information (such as SINR) using a delay value K, according to some embodiments.

In some embodiments, a method 1000 for operating a wireless user equipment (UE) device may include the operations shown in FIG. 10. (The method 1000 may also include any subset of the elements, embodiments and features described above in connection with FIGS. 1-9 and below in connection with FIGS. 11-22.) The wireless UE device may be configured as variously described above, e.g., as described in connection with user equipment 600 of FIG. 6. The method 1000 may be performed by a processing element of the UE device. The processing element may perform following the operations.

At 1010, the processing element may perform a measurement for a beam in a first time interval. The measurement for the beam may include a measurement on a channel measurement resource (CMR) and/or a measurement of an interference measurement resource (IMR) during the first time interval. A base station (e.g., a gNB of 5G NR) may configure details of the measurement process and type of reporting.

At 1015, the processing element may determine beam quality information based at least on the measurement. For example, the beam quality information may include a signal to interference-and-noise ratio (SINR), or a channel measurement based on the CMR, or a measurement of interference and/or noise based on the IMR.

At 1020, the processing element may transmit the beam quality information to a base station in a second time interval, where an amount of delay between the first time interval and the second time interval is controlled by a delay value K.

In some embodiments, the first and second time intervals are time slots, and the delay value K defined a slot delay.

In some embodiments, prior to said performing the measurement operation 1010, the processing element may receive a configuration message indicating the delay value K. The UE device may determine the second time interval based on the delay value K and the first time interval.

In some embodiments, the processing element may transmit a signal indicating the delay value K to the base station.

In some embodiments, the delay value K is predefined, e.g., as described above.

In some embodiments, the delay value K corresponds to a subcarrier spacing of a bandwidth part carrying downlink resources used to perform the measurement.

In some embodiments, the delay value K corresponds to a subcarrier spacing of a bandwidth part used to transmit said beam quality information.

In some embodiments, the beam may be a transmit beam associated with a downlink signal, where the measurement is performed on measurement resources in the downlink signal. The transmit beam may be a beam generated by the base station and used by the base station to transmit the downlink signal.

In some embodiments, the beam may be a receive beam associated with a downlink signal, wherein the measurement is performed on measurement resources in the downlink signal. The receive beam may be a beam applied to antenna signals by the UE device.

Reporting Based on N Measurement Instances and Averaging

In some embodiments, for each signal quality report (e.g., SINR report), a user equipment (UE) may determine signal quality information based on an N-shot measurement process, wherein N is a positive integer. The signal quality information may include signal to interference-and-noise ratio (SINR), or a measurement of channel power, or a measurement of interference and/or noise power, or a combination of the foregoing.

In some embodiments, the number N may be configured (or determined or conditioned) based on higher layer signaling, e.g., Radio Resource Control (RRC) signaling. In one embodiment, the UE may determine the number N based at least in part on whether a measurement restriction has been configured for a measurement resource. The base station (e.g., the gNB of 5G NR) may configure a measurement restriction for a channel measurement resource (CMR), or for an interference measurement resource (IMR), or for both the CMR and IMR. If a measurement restriction has been configured on the CMR, the UE may perform measurement of signal power based on the most recent instance of the CMR (e.g., Synchronization Signal Block or CSI Reference Signal). Likewise, if a measurement restriction has been configured on the IMR, the UE may measure power of interference and/or noise based on the most recent instance of the IMR (zero power based or non-zero power based). Thus, the UE may compute SINR based on a single shot measurement of channel power and/or a single shot measurement of interference and/or noise power. If no measurement restriction has been configured (i.e., if neither CMR nor IMR is restricted), the UE may measure signal power based on the N CMR instances prior to the SINR report, and measure power of the interference and/or noise based on the N IMR instances prior to the SINR report.

In some embodiments, the number N may be reported to the base station, e.g., as part of UE capability information.

In some embodiments, the number N predefined, e.g., defined in a specification promulgated by a standardization organization.

Figure 11:
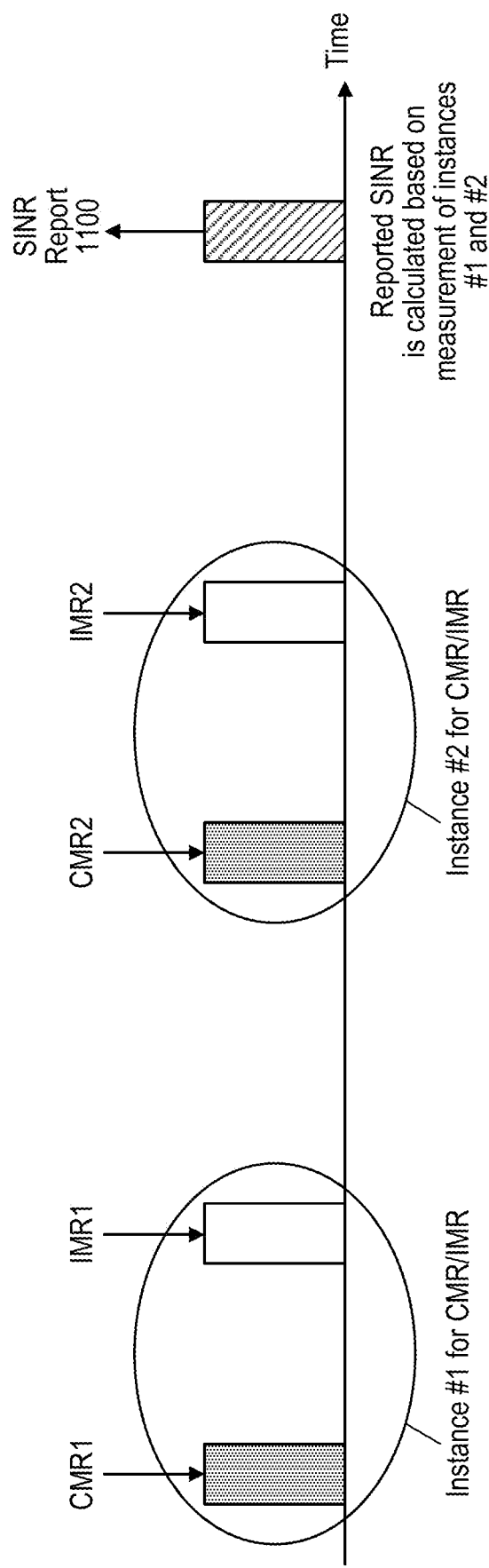
FIG. 11 illustrates an example of an SINR report 1100 that is based on measurements at a plurality of temporal instances (or temporal intervals), according to some embodiments.

In some embodiments, the UE may calculate an average SINR based on the averaging of SINR (or, ratio of signaling power to interference power) over a plurality of CMR/IMR instances, and then report the average SINR to the base station. Each CMR/IMR instance may include a corresponding CMR and a corresponding IMR. FIG. 11 illustrates an SINR report 1100 that is based on measurement of two instances (instance #1 and instance #2) of CMR/IMR. Instance #1 includes CMR1 and IMR1, and instance #2 includes CMR2 and IMR2.

In one embodiment, the UE may determine whether a measurement restriction has been configured by the base station, e.g., before computing the SINR to be reported, or before transmitting the SINR report 1100. The UE may report the average SINR in response to determining that a measurement restriction has not been configured for the beam being measured. If a measurement restriction has been configured, the UE may report an SINR based on single shot measurement.

In one embodiments, the UE may compute the reported SINR 1100 based on an average over the two instances:
SignalPower#1=Power of CMR1
InterferenceAndNoisePower#1=Power of IMR1
SignalPower#2=Power of CMR2
InterferenceAndNoisePower#2=Power of IMR2
SINR1=SignalPower#1/InterferenceAndNoisePower#1
SINR2=SignalPower#2/InterferenceAndNoisePower#2
Reported_SINR=(SINR1+SINR2)/2.

It should be noted that the above set of formulas represent one particular method for computing the reported SINR. A wide variety of other methods are possible and contemplated.

In another embodiment, the UE may compute the reported SINR 1100 based on the following set of formulas:
SignalPower#1=Power of CMR1
I&N_Pwr#1=Power of IMR1
SignalPower#2=Power of CMR2
I&N_Pwr#2=Power of IMR2

AverageSignalPower=(SignalPower#1+SignalPower#2)/2

Avg_I&N_Pwr=(I&N_Pwr#1+I&N_Pwr#2)/2

Reported_SINR=AverageSignalPower/Avg_IandN_Pwr.

In some embodiments, the UE may calculate an average signal power based on the averaging of signal power over a plurality of CMR instances. The average signal power may be reported to the base station, or used to compute an SINR, which is reported.

In some embodiments, the UE may calculate an average power of noise and/or interference based on averaging the power of noise and/or interference over a plurality of IMR instances. The average power of noise and/or interference may be reported to the base station, or used to compute an SINR, which is reported.

In some embodiments, if a transmission configuration indication (TCI) for the CMR/IMR is changed, which indicates that a new beam is being indicated by the base station, the UE may discard partial results of averaging for the previous beam, and start the averaging process for the new beam.

In some embodiments, a method 1200 for operating a wireless user equipment (UE) device may include the operations shown in FIG. 12. (The method 1200 may also include any subset of the elements, embodiments and features described above in connection with FIGS. 1-11 and below in connection with FIGS. 13-22.) The wireless UE device may be configured as variously described above, e.g., as described in connection with user equipment 600 of FIG. 6. The method 1200 may be performed by a processing element of the UE device.

At 1210, the processing element may perform N measurements for a beam at N respective measurement instances, e.g., as variously described above. N is a positive integer. In some embodiments, the value of N used to perform said N measurements may depend on whether a measurement restriction has been configured for said performing N measurements. For example, in one embodiment, the value of N equals one when a measurement restriction has been configured, but is greater than one when a measurement restriction has not been configured.

At 1215, the processing element may transmit beam information (relating to the beam) to a base station. The beam information includes quality information derived from the N measurements. For example, the quality information may include signal to information-and-noise ratio (SINR), or signal power, or interference power, or power of interference and noise, or reference signal receiver power (RSRP).

In some embodiments, N is greater than one, and the quality information is based on an average of the N measurements. The average may be performed, e.g., as variously described above.

In some embodiments, the processing element may receive a configuration message indicating a value of N prior to performing the N measurements.

In some embodiments, the processing element may transmit information indicating to the base station the value of N. For example, this information indicating the value of N may be transmitted as part of UE capability information.

In some embodiments, the value of N is predefined, e.g., defined in a specification promulgated by a standardization organization.

In some embodiments, the quality information includes a signal to interference-and-noise ratio (SINR) for the beam.

In some embodiments, a method 1300 for operating a wireless user equipment (UE) device may include the operations shown in FIG. 13. (The method 1300 may also include any subset of the elements, embodiments and features described above in connection with FIGS. 1-12 and below in connection with FIGS. 14-22.) The wireless UE device may be configured as variously described above, e.g., as described in connection with user equipment 600 of FIG. 6. The method 1300 may be performed by a processing element of the UE device.

At 1310, the processing element may perform N signal measurements and M interference measurements for a beam, wherein N is a positive integer, wherein M is a positive integer. The integer M may be different from N. The N signal measurements may be performed at N respective measurement instances, and the M interference measurements may be performed at M respective measurement instances. Measurement instances may be time intervals, e.g., time slots or symbol intervals or subframes in a downlink signal transmitted by a base station (e.g., a gNB of 5G NR). Each of the N signal measurements may be based on a channel measurement resource (CMR) at a corresponding one of the N measurement instances; and each of the M signal measurements may be based on an interference measurement resource (IMR) at a corresponding one of the M measurement instances.

At 1315, the processing element may transmit beam information for the beam to a base station. The beam information may include quality information derived from the N signal measurements and the M interference measurements.

In some embodiments, the processing element may receive a configuration message indicating the value of N and/or the value of M from the base station, e.g., prior performing the N signal measurements and the M interference measurements.

In some embodiment, the processing element may transmit information indicating to the base station the value of N and/or the value of M. The base station may thus be informed regarding the statistical reliability or uncertainty of the quality information.

In some embodiments, the value of N and/or the value of M may be predefined.

In some embodiments, one or more of the N measurement instances are identical to corresponding ones of the M measurement instances. In other words, the intersection between the N measurement instances and the M measurement instances, when interpreted as sets, is nonempty.

In some embodiments, the N measurement instances are periodic in time, wherein the M measurement instances are also periodic in time, but with a different period than the N measurement instances.

In some embodiments, the N measurement instances and the M measurement instances are disjoint, as sets.

In some embodiments, N is a positive integer multiple of M. In other embodiments, M is a positive integer multiple of N.

Collision Handling

In some embodiment, the L1-SINR may be carried by PUCCH or PUSCH. Thus, it is possible for collisions to occur between reports of signal to interference-and-noise ratio (SINR) and other signals. (L1 is an acronym for Layer 1, i.e., the Physical Layer.)

In a first case (Case 1), it is possible for a Physical Uplink Control (PUCCH) including an L1 SINR to overlap in time with a sounding reference signal (SRS), e.g., as illustrated in FIG. 14A. Observe the colliding symbols in which the PUCCH with L1 SINR overlaps with SRS.

In a second case (Case 2), a PUCCH with L1-SINR overlaps in time with a Physical Uplink Shared Channel (PUSCH) containing other channel state information (CSI). In some embodiments, the other CQI may include any include subset of the following: Reference Signal Received Power (RSRP), Channel Quality Indicator (CQI), Precoding Matrix Indicator (PMI), Rank Indicator (RI), and Layer Indicator (LI).

In a third case (Case 3), a PUSCH with L1-SINR overlaps in time with a PUCCH containing other CSI. In some embodiments, the other CSI may include any subset of RSRP, CQI, PMI, RI and LI.

In a fourth case (Case 4), a PUSCH with L1-SINR overlaps in time with a PUCCH containing L1-SINR.

FIG. 14B generically illustrates overlap in either of cases 2 and 4. Observe the collided symbols in which the PUCCH with L1-SINR overlaps with PUSCH containing either other CSI (case 2) or an L1-SINR (case 4).

In some embodiments, it may be desirable to avoid such collisions, e.g., in order to enable the UE to employ any of various methods which lower the peak to average power ratio (PAPR) of the uplink symbol(s) containing the L1-SINR.

In some embodiments, when a PUCCH that contains SINR collides with a periodic SRS, the UE may drop the PUCCH and transmit the SRS, or alternatively, may drop the SRS and transmit the PUCCH.

In some embodiments, when a PUCCH that contains SINR collides with an aperiodic SRS, the UE may drop the PUCCH and transmit the aperiodic SRS, or alternatively, may drop the aperiodic SRS and transmit the PUCCH.

In some embodiments, when a PUCCH that contains SINR collides with a semi-static SRS, the UE may drop the PUCCH and transmit the semi-static SRS, or alternatively, may drop the semi-static SRS and transmit the PUCCH.

In some embodiments, the selection of which alternative (drop X and transmit Y, or, drop Y and transmit X) is to be applied in case of collision may be configured by higher layer signaling, or be predefined, or be based on UE capability.

In some embodiments, different alternatives may be applied to different types of SINR report over PUCCH, e.g. periodic, semi-persistent, and aperiodic SINR report. For example, if a PUCCH containing a periodic SINR report collides with an aperiodic SRS, the UE may drop of the periodic SINR report, whereas if PUCCH containing an aperiodic SINR report collides with an aperiodic SRS, the UE may drop the aperiodic SRS. A wide variety of other examples are possible and contemplated.

In some embodiments, a user equipment (UE) may be configured as follows. For PUCCH and SRS on the same carrier, the UE may inhibit transmission of SRS when semi-persistent and periodic SRS are configured in the same symbol(s) with PUCCH carrying only CSI report(s), or only L1-RSRP report(s) or only L1-SINR report(s). The UE may inhibit transmission of SRS when semi-persistent or periodic SRS is configured or aperiodic SRS is triggered to be transmitted in the same symbol(s) with PUCCH carrying HARQ-ACK and/or SR. (HARQ is acronym for Hybrid ARQ. ARQ is an acronym for Automatic Repeat Request. ACK is an acronym for Acknowledgement. SR is an acronym for Scheduling Request.) In the case that SRS is not transmitted due to overlap with PUCCH, the UE may drop only the SRS symbol(s) that overlap with PUCCH symbol(s). PUCCH transmission may be inhibited when aperiodic SRS is triggered to be transmitted to overlap in the same symbol with PUCCH carrying semi-persistent/periodic CSI report(s) or semi-persistent/periodic L1-RSRP report(s) or semi-persistent/periodic L1-SINR report(s) only.

Figure 15:
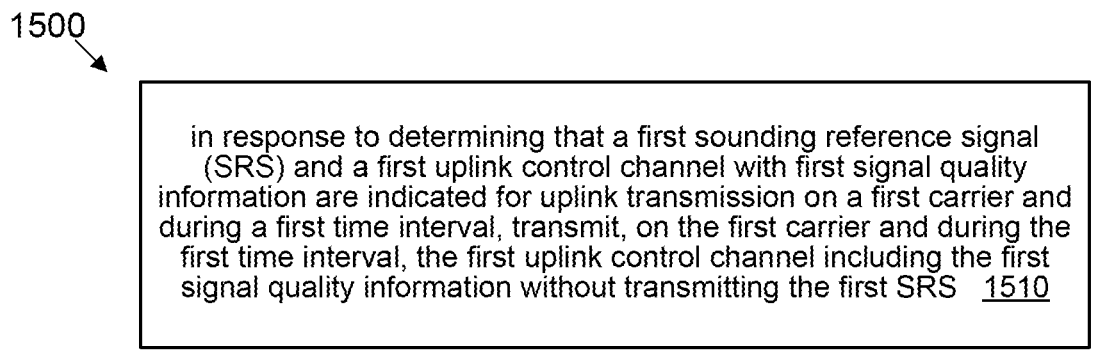
FIG. 15 illustrates an example of a method for handling an anticipated temporal collision of a sounding reference signal and an uplink control channel bearing signal quality information, according to some embodiments.

In some embodiments, a method 1500 for operating a wireless user equipment (UE) device may include the operations shown in FIG. 15. (The method 1500 may also include any subset of the elements, embodiments and features described above in connection with FIGS. 1-14B and below in connection with FIGS. 16-22.) The wireless UE device may be configured as variously described above, e.g., as described in connection with user equipment 600 of FIG. 6. The method 1500 may be performed by a processing element of the UE device.

At 1510, in response to determining that a first sounding reference signal (SRS) and a first uplink control channel with first signal quality information are indicated for uplink transmission on a first carrier and during a first time interval, the processing element may transmit, on the first carrier and during the first time interval, the first uplink control channel including the first signal quality information without transmitting the first SRS.

The action of transmitting the first uplink control channel may include generating a transmit symbol including the first uplink control channel but not including the SRS. (Because the SRS is omitted, the processing element may be able to generate the transmit symbol with decreased PAPR relative to the hypothetical case where the transmit symbol is required to include both the first uplink control channel and the SRS.) The transmit symbol may be included in an uplink baseband signal, to be transmitted using the RF subsystem.

In some embodiments, the first SRS is a semi-persistent SRS or a periodic SRS.

In some embodiments, the first uplink control channel is a Physical Uplink Control Channel (PUCCH), and the signal quality information is related to a beam.

In some embodiments, in response to determining that an aperiodic sounding reference signal (SRS) and a second uplink control channel with second signal quality information are indicated for uplink transmission on the first carrier and during a second time interval, the processing element may transmit, on the first carrier and during the second time interval, the aperiodic SRS without transmitting the second uplink control channel.

In some embodiments, the processing element may measure a signal to interference-and-noise ratio (SINR) for a beam, wherein the first signal quality information is based on the SINR.

In some embodiments, the time interval is a symbol interval. In another embodiment, the time interval is a time slot.

In some embodiments, prior to said transmitting, the processing element may receive a configuration message that directs the processing element to inhibit periodic SRS transmission in case of collision with an uplink control channel that contains signal quality information.

In some embodiments, the UE may employ a priority rule to determine which types of channel state information (CSI) information to transmit in case of a collision between different types of CSI information. The following are examples of different priority rules.

According to a first priority rule, CSI other than RSRP and SINR has a highest drop priority; RSRP has an intermediate drop priority; and SINR has a lowest drop priority. This first priority rule may be expressed symbolically as:

CSI other than RSRP/SINR>RSRP>SINR.

Note that the signal(s) with higher drop priority would be dropped when collision happens. The signal with the lowest drop priority may be transmitted.

According to a second priority rule, CSI other than RSRP and SINR has a highest drop priority; SINR has an intermediate drop priority; and RSRP has a lowest drop priority. This second priority rule may be expressed symbolically as:

CSI other than RSRP/SINR>SINR>RSRP.

According to a third priority rule, SINR has a highest drop priority; CSI other than RSRP and SINR has an intermediate drop priority; and RSRP has a lowest drop priority:

SINR>CSI other than RSRP/SINR>RSRP

According to a fourth priority rule, SINR and RSRP together share a drop priority that is lower than the drop priority of CSI other than SINR and RSRP:

SINR/RSRP<CSI other than SINR/RSRP.

According to a fifth priority rule, SINR and RSRP together share a drop priority that is higher than the drop priority of CWI other than SINR and RSRP.

SINR/RSRP>CSI other than SINR/RSRP.

When the UE operates according to the fourth priority rule or the fifth priority rule, the UE does not expect to be configured to report SINR and RSRP in the same slots within a bandwidth part or across bandwidth parts.

In some embodiments, a user equipment (UE) may be configured as follows. Channel State Information (CSI) reports may be associated with a priority value $Pri_{iCSI}(y,k,c,s)=2N_{cell}M_s y+N_{cells}M_s k+M_s c+s,$ wherein the subscript iCSI may be interpreted as an instance i of a CSI report, where y=0 for aperiodic CSI reports to be carried on PUSCH, y=1 for semi-persistent CSI reports to be carried on PUSCH, y=2 for semi-persistent CSI reports to be carried on PUCCH and y=3 for periodic CSI reports to be carried on PUCCH; k=0 for CSI reports carrying L1-RSRP or L1-SINR, and k=1 for CSI reports not carrying L1-RSRP or L1-SINR; c is the serving cell index and $N_{cells}$ is the value of the higher layer parameter maxNrofServingCells; and s is the reportConfigID and $M_s$ is the value of the higher layer parameter maxNrofCSI-ReportConfigurations. The UE does not expect to be configured (by the base station) to report L1-RSRP and L1-SINR in the same slot within a bandwidth part.

In some embodiments, a user equipment (UE) may configured as follows. CSI reports may be associated with a priority value $Pri_{iCSI}(y,k,c,s)=2N_{cells}M_s y+N_{cell}M_s k+M_s c+s,$ wherein the subscript iCSI may be interpreted as an instance i of a CSI report, where y=0 for aperiodic CSI reports to be carried on PUSCH, y=1 for semi-persistent CSI reports to be carried on PUSCH, y=2 for semi-persistent CSI reports to be carried on PUCCH, and y=3 for periodic CSI reports to be carried on PUCCH; k=−1 for CSI reports carrying L1-SINR, k=0 for CSI reports carrying L1-RSRP, and k=1 for CSI reports not carrying L1-RSRP or L1-SINR; c is the serving cell index and $N_{cells}$ is the value of the higher layer parameter maxNrofServingCells; and s is the reportConfigID and $M_s$ is the value of the higher layer parameter maxNrofCSI-ReportConfigurations.

Figure 16:
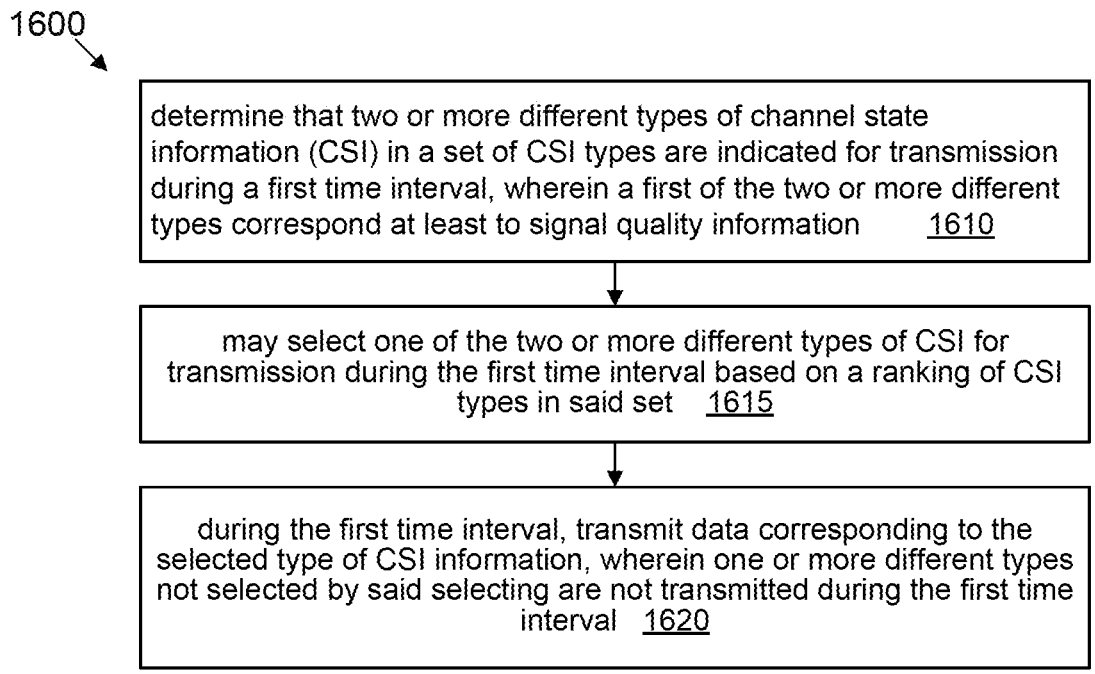
FIG. 16 illustrates an example of a method for handling an anticipated temporal collision of two or more different types of channel state information, according to some embodiments.

In some embodiments, a method 1600 for operating a wireless user equipment (UE) device may include the operations shown in FIG. 16. (The method 1600 may also include any subset of the elements, embodiments and features described above in connection with FIGS. 1-15 and below in connection with FIGS. 17-22.) The wireless UE device may be configured as variously described above, e.g., as described in connection with user equipment 600 of FIG. 6. The method 1600 may be performed by a processing element of the UE device.

At 1610, the processing element may determine that two or more different types of channel state information (CSI) in a set of CSI types are indicated for transmission during a first time interval, wherein a first of the two or more different types correspond at least to signal quality information. The first time interval may be, e.g., a symbol interval. (or a set of contiguous symbol intervals).

At 1615, the processing element may select one of the two or more different types of CSI for transmission during the first time interval based on a ranking of CSI types in said set.

At 1620, during the first time interval, the processing element may transmit data corresponding to the selected type of CSI information, wherein one or more different types not selected by said selecting are not transmitted during the first time interval.

In some embodiments, the ranking assigns a highest priority for transmission to the first type.

In some embodiments, the ranking assigns a lowest priority for transmission to the first type.

In some embodiments, the set of CSI types includes: the first type corresponding signal quality information; a second type corresponding to Reference Signal Received Power (RSRP); and a third type corresponding to CSI other than RSRP or signal quality information. In one of these embodiments, the ranking assigns a highest priority for transmission to the second type, a second highest priority for transmission to the first type; and third highest priority for transmission to the third type.

In some embodiments, the first type corresponds to signal quality information and Reference Signal Received Power (RSRP); the set of CSI types includes the first type and a second type; and the second type corresponding to CSI other than signal quality information and RSRP.

In some embodiments, the signal quality information is Signal to Interference-and-Noise Ratio (SINR); and the ranking is defined by a formula that includes a term linear in an integer parameter k, wherein k is set equal to zero for a CSI report carrying SINR.

In some embodiments, the signal quality information is Signal to Interference-and-Noise Ratio (SINR); and the ranking is defined by a formula that includes a term linear in an integer parameter k, wherein k is set equal to a negative value for a CSI report carrying SINR.

In some embodiments, a user equipment (UE) may compute a differential L1-SINR for a given beam in a set of available beams. The differential L1-SINR may be computed, e.g., relative to the highest SINR among the available beams. The differential L1-SINR may be quantized prior to transmission of a report to the base station. Transmission of differential SINR allows the UE to decrease reporting overhead. However, when the differential SINR is out of the quantization range of the quantization process (e.g., by virtue of being less than the lowest quantization threshold), the ensuing report of the quantized differential SINR reveals very little about whether the beam is workable. The beam may have an absolute SINR that is smaller than a workability threshold, and thus, be too weak to support quality communication with the base station. For example, with reference to the table below, the difference between beam #1 (the reference beam) and beam #3 and the difference between beam #1 and beam #4 could both be out of the quantization range of differential L1-SINR, but the quantized differential SINR reported to the base station (e.g., a gNB of 5G NR) would provide no information on whether beam #3 or beam #4 would be a better beam.

| Beam Index | SINR |
|---|---|
| 1 | 25 dB |
| 2 | 10 dB |
| 3 | −2 dB |
| 4 | −15 dB |

In some embodiments, two states of differential L1-SINR report may correspond to the differential SINR being out of the quantization range, but may be used to distinguish whether or not the measured SINR is greater than or less than a workability threshold. As example of this quantization mechanism is illustrated in FIG. 17. For each reported value (in the first column) of the quantized differential SINR, there is a corresponding quantization range (in the second column) for the differential SINR. Observe that the reported value DIFFSINR_14 indicates that the differential SINR is less than or equal to a lowest quantization threshold (i.e., −28 dB) and that the absolute SINR is greater than or equal to a workability threshold. Thus, the base station would be informed that the beam is workable. Furthermore, observe that the reported value DIFFSINR_15 indicates that the differential SINR is less than or equal to the lowest quantization threshold (i.e., −28 dB) and that the absolute SINR is less than the workability threshold. Thus, the base station would be informed that the beam is not workable. (The base station eliminate this beam from further consideration as a possible candidate for communication with the UE, at least for the near future.)

While FIG. 17 shows a quantization table having a reported value with 16 possible states, it should be understood that any number of states may be used, e.g., as desired or deemed appropriate for the application being targeted. Furthermore, while the third column of FIG. 17 indicates that the differential SINR has units of dB, other units may be used as desired or as deemed appropriate in the application under consideration.

Figure 18:
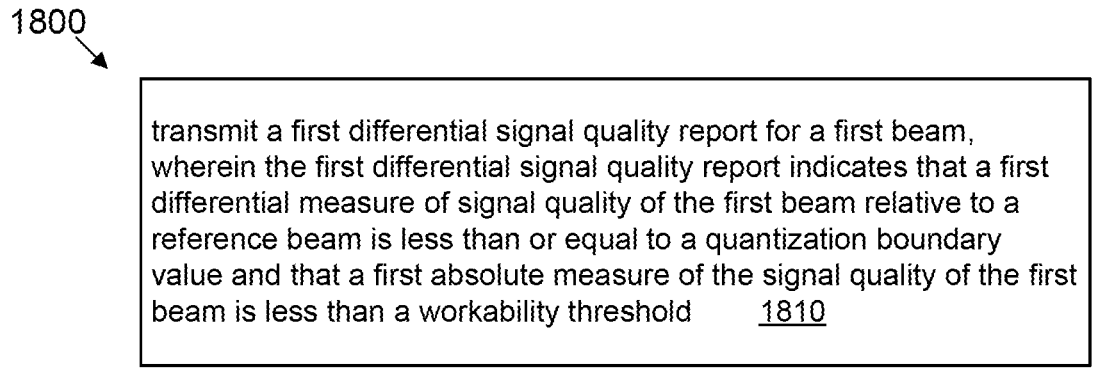
FIG. 18 illustrates an example of a method for informing a base station that a beam has signal quality worse than a workability threshold, according to some embodiments.

In some embodiments, a method 1800 for operating a wireless user equipment (UE) device may include the operations shown in FIG. 18. (The method 1800 may also include any subset of the elements, embodiments and features described above in connection with FIGS. 1-17 and below in connection with FIGS. 19-22.) The wireless UE device may be configured as variously described above, e.g., as described in connection with user equipment 600 of FIG. 6. The method 1800 may be performed by a processing element of the UE device.

At 1810, the processing element may transmit a first differential signal quality report for a first beam. The first differential signal quality report may indicate that a first differential measure of signal quality of the first beam relative to a reference beam is less than or equal to a quantization boundary value and that a first absolute measure of the signal quality of the first beam is less than a workability threshold. The workability threshold may be chosen so that a beam with absolute signal quality measure less than the workability threshold is deemed to be not of sufficient quality to support communication with the base station. Conversely, a beam with absolute signal quality measure greater than the workability threshold may be deemed to be workable, or possibly workable.

In some embodiments, the first absolute measure of signal quality is signal to interference-and-noise ratio (SINR), and the first differential measure of signal quality is differential SINR.

In some embodiments, the processing element may transmit a second differential signal quality report for the first beam (e.g., at a later time). The second differential signal quality report may indicate that a second differential measure of signal quality of the first beam relative to the reference beam is less than or equal to the quantization boundary value and that a second absolute measure of the signal quality of the first beam is greater than or equal to the workability threshold.

In some embodiments, the processing element may transmit a differential signal quality report for a second beam (B2). The differential signal quality report for the second beam may indicate that a differential measure of signal quality ($\Delta SigQuality_{B2}$) of the second beam relative to the reference beam is less than or equal to the quantization boundary value and that an absolute measure of signal quality ($SigQuality_{B2}$) of the second beam is greater than or equal to the workability threshold.

In some embodiments, the workability threshold is defined in specification promulgated by a standardization organization.

In some embodiments, the workability threshold is configured by higher layer signaling.

In some embodiments, the workability threshold is based on a UE capability, and thus, may vary one UE to another. (Different UEs may have different sets of capabilities.)

In some embodiments, if a user equipment (UE) determines that the SINR of a beam is less than a workability threshold, the UE does not report the SINR for the beam. Furthermore, if the base station (e.g., a gNB or 5G NR) has configured the UE to report SINR for N>1 beams, the UE may determine the SINR for each beam in a set of available beams, determine the N largest SINRs among the available beams, and transmit to the base station an indication that it is not able to detect N workable beams if one or more of the N largest SINRs is less than a workability threshold. In some embodiments, the indication takes the form of special state of a beam index. The special state indicates that there is no beam report for one or more of the requested N beams. In other embodiments, the indication takes the form of a particular state of a differential SINR report. The particular state indicates that there is no beam report for one or more of the requested N beams.

Figure 19:
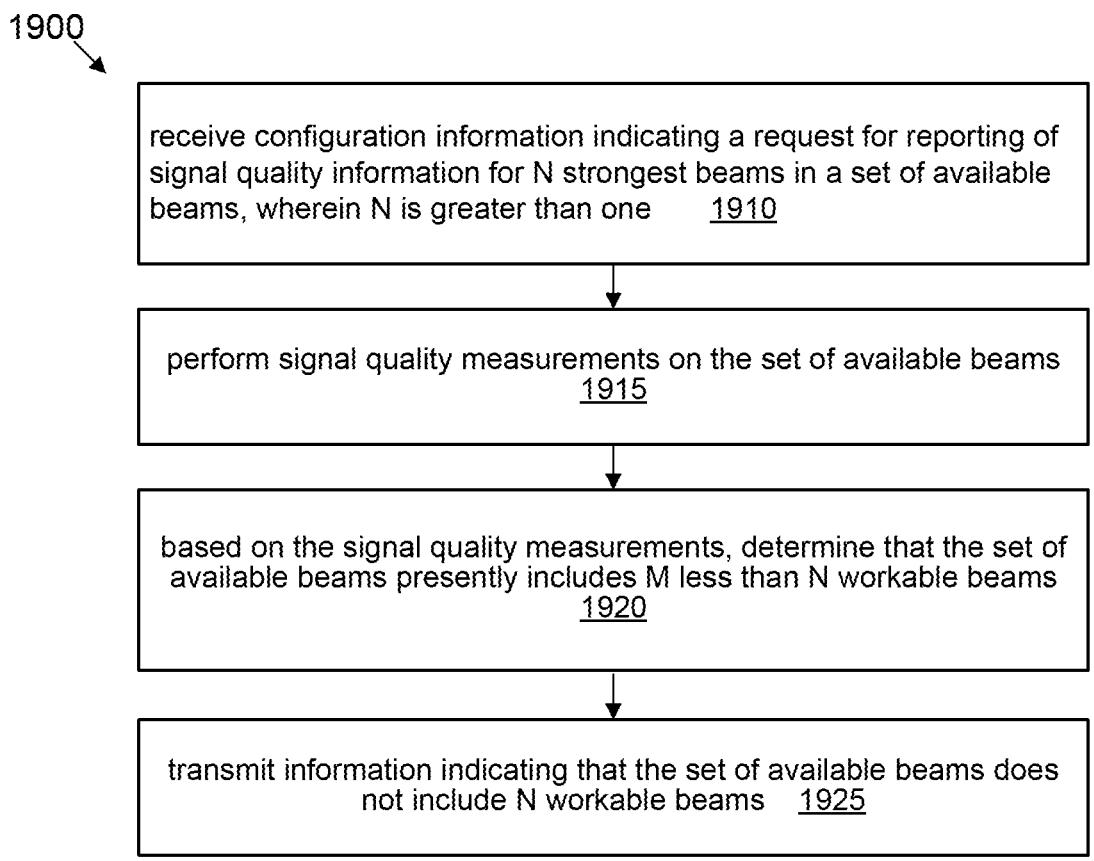
FIG. 19 illustrates an example of a method for indicating to a base station that a set of available beams measured by the user equipment does not include a complete set of workable beams, according to some embodiments.
Figure 22:
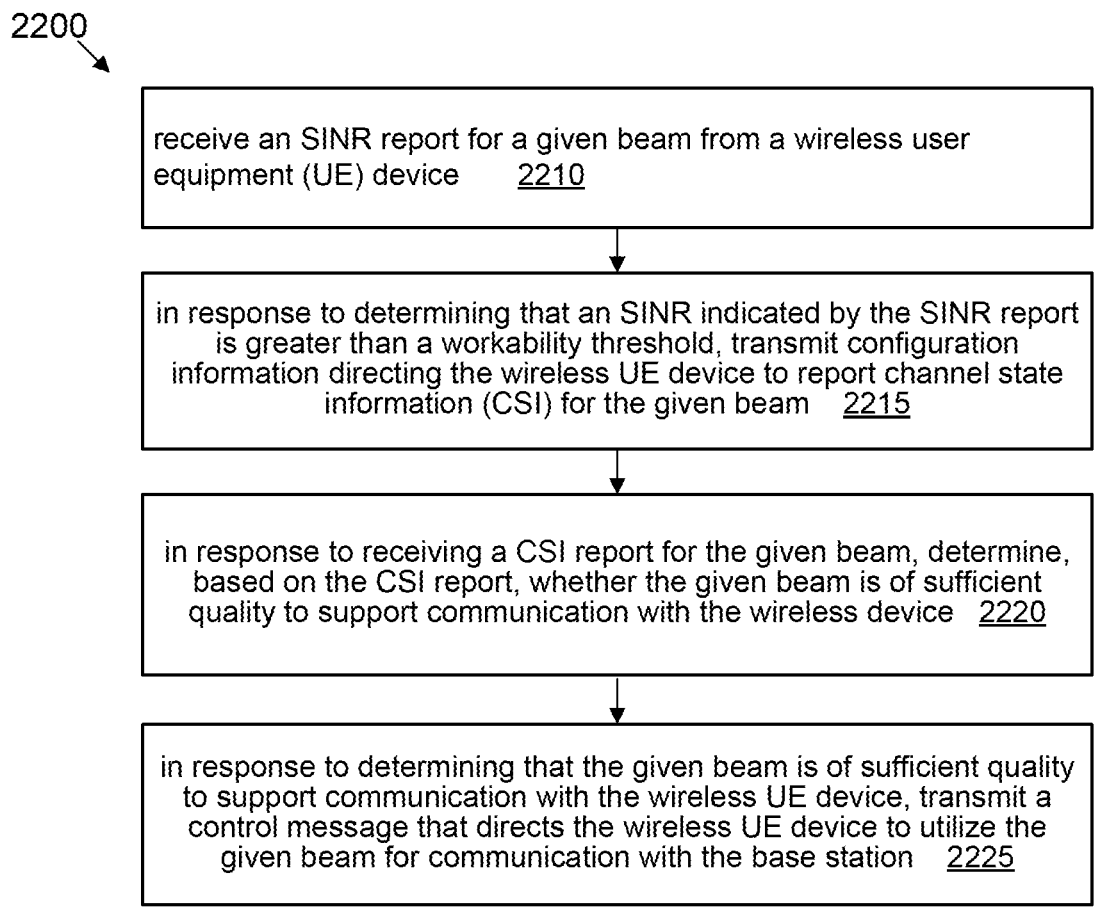
FIG. 22 illustrates an example of a method for enabling a base station to determine the workability (or suitability) of a beam, according to some embodiments.

In some embodiments, a method 1900 for operating a wireless user equipment (UE) device may include the operations shown in FIG. 19. (The method 1900 may also include any subset of the elements, embodiments and features described above in connection with FIGS. 1-18 and below in connection with FIGS. 20-22.) The wireless UE device may be configured as variously described above, e.g., as described in connection with user equipment 600 of FIG. 6. The method 1900 may be performed by a processing element of the UE device.

At 1910, the processing element may receive configuration information indicating a request for reporting of signal quality information for N strongest beams (or the N beams of highest signal quality) in a set of available beams, wherein N is greater than one.

At 1915, the processing element may perform signal quality measurements on the set of available beams, e.g., measurements of signal to interference-and-noise ratio (SINR). The measurements may be performed, e.g., as variously described above.

At 1920, based on the signal quality measurements, the processing element may determine that the set of available beams presently includes M less than N workable beams (i.e., M workable beams, where M is less than N). For example, the processing element may determine that the N highest of the signal quality measurements includes one or more that are less than a workability threshold.

At 1925, the processing element may transmit information indicating that the set of available beams does not include N workable beams. In some embodiments, said information may include a beam index whose value indicates that the set of available beams does not include N workable beams. In other embodiments, said information may include a differential SINR report whose value indicates that the set of available beams does not include N workable beams.

In some embodiments, said information includes a particular value (or state) of a beam index, where the particular value indicates that the set of available beams does not include N workable beams. (Other possible values of the beam index, which would be used in different circumstances than that of FIG. 19, may indicate respective beams of the available set, or respective beams known to the base station.) The base station (e.g., a gNB of 5G NR) may receive the particular value of the beam index, and be thereby informed that the UE will not be transmitting a full set of N signal quality reports.

In some embodiments, said information includes a special value of a differential SINR report, wherein the special value indicates that the set of available beams does not include N workable beams. (Other possible values of the differential SINR report, which would be used in different circumstances than that of FIG. 19, may represent quantized values of differential SINR for a measured beam.)

In some embodiments, the number M of workable beams is positive, whereupon the processing element may transmit signal quality information for each of the M workable beams.

In some embodiments, the number M is greater than one, whereupon the processing element may: transmit absolute signal quality information for a strongest of the M workable beams; and transmit differential signal quality information for the M−1 workable beams other than the strongest workable beam.

In some embodiments, the workability threshold is defined in specification promulgated by a standardization organization.

In some embodiments, the workability threshold is configured by higher layer signaling.

In some embodiments, the workability threshold is based on a UE capability, and thus, may vary one UE to another.

In some embodiments, a differential SINR report may have a set of possible reported values as shown in FIG. 20. One of the possible reported values (see DIFFSINR_15) is used to signal an invalid beam (or, to signal that one or more beams are invalid) to the base station. Other possible reported values may represent quantized values of a differential SINR measurement for a beam, each quantized value corresponding to respective interval of differential SINR. While FIG. 20 illustrates a differential SINR report having 16 possible states, it should be understood that the report may have any desired number of possible states. Furthermore, while the unit of differential SINR in FIG. 20 is dB, it should be understood that any other units may be used, as desired.

In some embodiments, whether the signal quality (e.g., SINR) of a beam is workable or not is determined by the base station (e.g., a gNB of 5G NR). After receiving the reported SINR for a beam, the base station may trigger a CSI report for the beam, to check whether the quality of the beam is sufficient to support communication with the UE.

In some embodiments, the UE may transmit a differential SINR report having possible reported values as shown in FIG. 21. Each possible reported value (in the first column) corresponds to respective interval (in the second column) of differential SINR. If the differential SINR for a beam occurs in one of the intervals, the UE may transmit the corresponding reported value to the base station.

In some embodiments, a method 2100 for operating a wireless user equipment (UE) device may include the operations shown in FIG. 21. (The method 2100 may also include any subset of the elements, embodiments and features described above in connection with FIGS. 1-20 and below in connection with FIG. 22.) The wireless UE device may be configured as variously described above, e.g., as described in connection with user equipment 600 of FIG. 6. The method 2100 may be performed by a processing element of the UE device.

At 2210, the processing element may receive an SINR report for a given beam from a wireless user equipment (UE) device.

At 2215, in response to determining that an SINR indicated by the SINR report is greater than a workability threshold, the processing element may transmit configuration information directing the wireless UE device to report channel state information (CSI) for the given beam. In one embodiment, the configuration information may direct the wireless UE device to generate a channel quality report, e.g., a channel quality report with higher accuracy or reliability than the SINR report. To obtain the channel quality report, the UE may be required to account for factors such as signal processing gain in the UE receiver and a known precoding gain of the base station's transmitter.

At 2220, in response to receiving a CSI report for the given beam, the processing element may determine, based on the CSI report, whether the given beam is of sufficient quality to support communication with the wireless device.

At 2225, in response to determining that the given beam is of sufficient quality to support communication with the wireless UE device, the processing element may transmit a control message that directs the wireless UE device to utilize the given beam for communication with the base station.

In some embodiments, the CSI includes signal quality information or differential signal quality information.

In some embodiments, the processing element may transmit a downlink signal on a downlink channel, wherein the downlink signal includes: a synchronization signal block (SSB) or channel state information (CSI) reference signals for channel measurement; and resources for interference measurement.

In some embodiments, the resources for interference measurement include zero power (ZP) based resources.

In some embodiments, the resources for interference measurement include non-zero power (NZP) based resources.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. An apparatus comprising:
at least one processor configured to cause a user equipment (UE) to:
perform a measurement for a beam in a first time interval, wherein the measurement is based on a channel measurement resource (CMR) and an interference measurement resource (IMR);
determine layer 1 signal to interference-and-noise ratio (L1 SINR) information based at least on the measurement;
transmit the L1-SINR information to a base station in a second time interval,
wherein if a measurement restriction is configured for the CMR, the UE performs the measurement corresponding to signal power and based on a most recent instance of the CMR;
wherein if a measurement restriction is not configured for the CMR, the UE performs the measurement corresponding to signal power and based on one or more instances of the CMR prior to transmitting the L1-SINR information;
wherein if a measurement restriction is configured for the IMR, the UE performs the measurement corresponding to at least one of interference and noise and based on a most recent instance of the IMR, and
wherein if a measurement restriction is not configured for the IMR, the UE performs the measurement corresponding to at least one of interference and noise and based on one or more instances of the IMR prior to transmitting the L1-SINR information.

2. The apparatus of claim 1, wherein an amount of delay between the first time interval and the second time interval is controlled by a delay value K, and wherein the at least one processor is further configured to cause the UE to:
prior to said performing the measurement, receive a configuration message indicating the delay value K.

3. The apparatus of claim 1, wherein an amount of delay between the first time interval and the second time interval is controlled by a delay value K, and wherein the at least one processor is further configured to cause the UE to:
transmit a signal indicating the delay value K to the base station.

4. The apparatus of claim 1, wherein an amount of delay between the first time interval and the second time interval is controlled by a delay value K, and wherein the delay value K is predefined.

5. The apparatus of claim 1, wherein an amount of delay between the first time interval and the second time interval is controlled by a delay value K, and wherein the delay value K corresponds to (a) a subcarrier spacing of a bandwidth part carrying downlink resources used to perform the measurement, or (b) a subcarrier spacing of a bandwidth part used to transmit said beam quality information.

6. The apparatus of claim 1, wherein the beam is a transmit beam associated with a downlink signal, and wherein the CMR and IMR are in the downlink signal.

7. The apparatus of claim 1, wherein the beam is a receive beam associated with a downlink signal, and wherein CMR and IMR are in the downlink signal.

8. A wireless device, comprising:
wireless communication circuitry; and
at least one processor coupled to the wireless communication circuitry and configured to cause the wireless device to:
perform a measurement for a beam in a first time interval, wherein the measurement is based on a channel measurement resource (CMR) and an interference measurement resource (IMR);
determine layer 1 signal to interference-and-noise ratio (L1-SINR) information based at least on the measurement;
transmit the L1-SINR information to a base station in a second time interval,
wherein if a measurement restriction is configured for the CMR, the UE performs the measurement corresponding to signal power and based on a most recent instance of the CMR,
wherein if a measurement restriction is not configured for the CMR, the UE performs the measurement corresponding to signal power and based on one or more instances of the CMR prior to transmitting the L1-SINR information,
wherein if a measurement restriction is configured for the IMR, the UE performs the measurement corresponding to at least one of interference and noise and based on a most recent instance of the IMR, and
wherein if a measurement restriction is not configured for the IMR, the UE performs the measurement corresponding to at least one of interference and noise and based on one or more instances of the IMR prior to transmitting the L1-SINR information.

9. The wireless device of claim 8, wherein an amount of delay between the first time interval and the second time interval is controlled by a delay value K, and wherein the at least one processor is further configured to cause the wireless device to:

prior to said performing the measurement, receive a configuration message indicating the delay value K.

10. The wireless device of claim 8, wherein an amount of delay between the first time interval and the second time interval is controlled by a delay value K, and wherein the at least one processor is further configured to cause the wireless device to:

transmit a signal indicating the delay value K to the base station.

11. The wireless device of claim 8, wherein an amount of delay between the first time interval and the second time interval is controlled by a delay value K, and wherein the delay value K is predefined.

12. The wireless device of claim 8, wherein an amount of delay between the first time interval and the second time interval is controlled by a delay value K, and wherein the delay value K corresponds to (a) a subcarrier spacing of a bandwidth part carrying downlink resources used to perform the measurement, or (b) a subcarrier spacing of a bandwidth part used to transmit said beam quality information.

13. The wireless device of claim 8, wherein the beam is a transmit beam associated with a downlink signal, and wherein the CMR and IMR are in the downlink signal.

14. The wireless device of claim 8, wherein the beam is a receive beam associated with a downlink signal, and wherein the CMR and IMR are in the downlink signal.

15. The wireless device of claim 8, wherein the first time interval and the second time interval are time slots.

16. A non-transitory memory medium storing program instructions, wherein the program instructions, when executed by a processor, cause a wireless user equipment (UE) device to perform operations comprising:

performing a measurement for a beam in a first time interval, wherein the measurement is based on a channel measurement resource (CMR) and an interference measurement resource (IMR);

determining layer 1 signal to interference-and-noise ratio (L1-SINR) information based at least on the measurement;

transmit the L1-SINR beam quality information to a base station in a second time interval, wherein if a measurement restriction is configured for the CMR, the UE performs the measurement corresponding to signal power and based on a most recent instance of the CMR, wherein if a measurement restriction is not configured for the CMR, the UE performs the measurement corresponding to signal power and based on one or more instances of the CMR prior to transmit the L1-SINR information, wherein if a measurement restriction is configured for the IMR, the UE performs the measurement corresponding to at least one of interference and noise and based on a most recent instance of the IMR, and wherein if a measurement restriction is not configured for the IMR, the UE performs the measurement corresponding to at least one of interference and noise and based on one or more instances of the IMR prior to transmit the L1-SINR information.

17. The non-transitory memory medium of claim 16, wherein an amount of delay between the first time interval and the second time interval is controlled by a delay value K, and wherein the operations further comprise:

prior to said performing the measurement, receiving a configuration message indicating the delay value K.

18. The non-transitory memory medium of claim 16, wherein an amount of delay between the first time interval and the second time interval is controlled by a delay value K, and wherein the operations further comprise:

transmitting a signal indicating the delay value K to the base station.

19. The non-transitory memory medium of claim 16, wherein an amount of delay between the first time interval and the second time interval is controlled by a delay value K, and wherein the delay value K corresponds to (a) a subcarrier spacing of a bandwidth part carrying downlink resources used to perform the measurement, or (b) a subcarrier spacing of a bandwidth part used to transmit said beam quality information.

20. The non-transitory memory medium of claim 16, wherein the beam is a transmit beam associated with a downlink signal, and wherein the CMR and IMR are in the downlink signal.

\* \* \* \* \*

UNITED STATES PATENT AND TRADEMARK OFFICE
CERTIFICATE OF CORRECTION

| | |
|---|---|
| PATENT NO. | : 11,451,361 B2 |
| APPLICATION NO. | : 17/023342 |
| DATED | : September 20, 2022 |
| INVENTOR(S) | : Yushu Zhang et al. |

It is certified that error appears in the above-identified patent and that said Letters Patent is hereby corrected as shown below:

In the Claims

Column 30, Line 1, delete "transmit" and insert --transmitting--

Column 30, Line 10, delete "transmit" and insert --transmitting--

Column 30, Line 19, delete "transmit" and insert --transmitting--

Signed and Sealed this
Sixth Day of June, 2023

Katherine Kelly Vidal
*Director of the United States Patent and Trademark Office*